United States Patent
Moore et al.

(10) Patent No.: US 10,109,319 B2
(45) Date of Patent: Oct. 23, 2018

(54) DIGITAL MEDIA EDITING

(71) Applicant: GoPro, Inc., San Mateo, CA (US)

(72) Inventors: Stephen Trey Moore, San Antonio, TX (US); Ross Chinni, Austin, TX (US); Devin McKaskle, Austin, TX (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/400,660

(22) Filed: Jan. 6, 2017

(65) Prior Publication Data

US 2017/0200473 A1  Jul. 13, 2017

Related U.S. Application Data

(60) Provisional application No. 62/276,627, filed on Jan. 8, 2016, provisional application No. 62/291,336, filed on Feb. 4, 2016.

(51) Int. Cl.
*G11B 27/00* (2006.01)
*G11B 27/34* (2006.01)
(Continued)

(52) U.S. Cl.
CPC ....... *G11B 27/031* (2013.01); *H04M 1/72522* (2013.01); *H04N 21/4126* (2013.01);
(Continued)

(58) Field of Classification Search
CPC .......... G11B 27/00; G11B 27/34; H04N 7/01; H04N 5/77; H04N 7/015
(Continued)

(56) References Cited

U.S. PATENT DOCUMENTS 5,130,794 A   7/1992  Ritchey
6,337,683 B1  1/2002  Gilbert
(Continued)

FOREIGN PATENT DOCUMENTS

WO  2001020466      3/2001
WO  2009040538 A1  4/2009
WO  2010071996 A1  7/2010

OTHER PUBLICATIONS

Ernoult, Emeric, 'How to Triple Your YouTube Video Views with Facebook', SocialMediaExaminer.com, Nov. 26, 2012, 16 pages.
(Continued)

*Primary Examiner* — Daquan Zhao
(74) *Attorney, Agent, or Firm* — Sheppard Mullin Richter & Hampton LLP

(57) ABSTRACT

Implementations are directed to providing a digital media editing environment for editing at least a portion of a digital video using a mobile device, establishing communication between the mobile device and a data source, receiving, from the data source, a first portion of the digital video, the first portion including a first set of frames including less than all frames of the digital video, applying an edit to the first portion of the digital video, while less than all frames of the first digital video are stored on the mobile device, subsequent to applying the at least one edit, receiving, from the data source, a second portion of the digital video, the second portion including a second set of frames, and storing an edited digital video including at least one frame of the first set of frames, at least one frame of the second set of frames, and the edit.

17 Claims, 37 Drawing Sheets

(51) Int. Cl.
  *G11B 27/031* (2006.01)
  *H04M 1/725* (2006.01)
  *H04N 21/414* (2011.01)
  *H04N 21/472* (2011.01)
  *H04N 21/41* (2011.01)
  *H04N 21/854* (2011.01)
  *H04N 7/01* (2006.01)
  *H04N 5/77* (2006.01)
  *H04N 7/015* (2006.01)
  *H04L 29/08* (2006.01)

(52) U.S. Cl.
  CPC . *H04N 21/41407* (2013.01); *H04N 21/47205* (2013.01); *H04N 21/854* (2013.01); *H04L 67/06* (2013.01)

(58) Field of Classification Search
  USPC ............ 386/280, 278, 282, 286, 239, 248
  See application file for complete search history.

(56) References Cited

U.S. PATENT DOCUMENTS

| | | |
|---|---|---|
| 6,593,956 B1 | 7/2003 | Potts |
| 7,222,356 B1 | 5/2007 | Yonezawa |
| 7,325,199 B1 | 1/2008 | Reid |
| 7,352,952 B2 | 4/2008 | Herberger |
| 7,483,618 B1 | 1/2009 | Edwards |
| 7,890,867 B1 | 2/2011 | Margulis |
| 8,446,433 B1 | 5/2013 | Mallet |
| 8,611,422 B1 | 12/2013 | Yagnik |
| 8,718,447 B2 | 5/2014 | Yang |
| 8,730,299 B1 | 5/2014 | Kozko |
| 8,763,023 B1 | 6/2014 | Goetz |
| 8,910,046 B2 | 12/2014 | Matsuda |
| 8,988,509 B1 | 3/2015 | Macmillan |
| 9,032,299 B2 | 5/2015 | Lyons |
| 9,036,001 B2 | 5/2015 | Chuang |
| 9,077,956 B1 | 7/2015 | Morgan |
| 9,111,579 B2 | 8/2015 | Meaney |
| 9,142,253 B2 | 9/2015 | Ubillos |
| 9,151,933 B2 | 10/2015 | Sato |
| 9,204,039 B2 | 12/2015 | He |
| 9,208,821 B2 | 12/2015 | Evans |
| 9,245,582 B2 | 1/2016 | Shore |
| 9,253,533 B1 | 2/2016 | Morgan |
| 9,317,172 B2 | 4/2016 | Lyons |
| 9,423,944 B2 | 8/2016 | Eppolito |
| 9,473,758 B1 | 10/2016 | Long |
| 9,479,697 B2 | 10/2016 | Aguilar |
| 9,557,885 B2 | 1/2017 | Moore |
| 9,564,173 B2 | 2/2017 | Swenson |
| 2004/0128317 A1 | 7/2004 | Sull |
| 2004/0216173 A1* | 10/2004 | Horoszowski .... G06F 17/30796 725/145 |
| 2005/0025454 A1 | 2/2005 | Nakamura |
| 2006/0122842 A1 | 6/2006 | Herberger |
| 2006/0265657 A1 | 11/2006 | Gilley |
| 2007/0173296 A1 | 7/2007 | Hara |
| 2007/0204310 A1 | 8/2007 | Hua |
| 2007/0230461 A1 | 10/2007 | Singh |
| 2008/0036917 A1 | 2/2008 | Pascarella |
| 2008/0044155 A1 | 2/2008 | Kuspa |
| 2008/0120550 A1 | 5/2008 | Oakley |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0208791 A1 | 8/2008 | Das |
| 2008/0244410 A1 | 10/2008 | Schormann |
| 2008/0253735 A1 | 10/2008 | Kuspa |
| 2008/0313541 A1 | 12/2008 | Shafton |
| 2009/0037818 A1 | 2/2009 | Lection |
| 2009/0088143 A1 | 4/2009 | Kim |
| 2009/0089651 A1 | 4/2009 | Herberger |
| 2009/0213270 A1 | 8/2009 | Ismert |
| 2009/0274339 A9 | 11/2009 | Cohen |
| 2009/0327856 A1 | 12/2009 | Mouilleseaux |
| 2010/0045773 A1 | 2/2010 | Ritchey |
| 2010/0064219 A1 | 3/2010 | Gabrisko |
| 2010/0086216 A1 | 4/2010 | Lee |
| 2010/0104261 A1 | 4/2010 | Liu |
| 2010/0174993 A1 | 7/2010 | Pennington |
| 2010/0183280 A1 | 7/2010 | Beauregard |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0275123 A1 | 10/2010 | Yu |
| 2010/0278504 A1 | 11/2010 | Lyons |
| 2010/0278509 A1 | 11/2010 | Nagano |
| 2010/0281375 A1 | 11/2010 | Pendergast |
| 2010/0281376 A1 | 11/2010 | Meaney |
| 2010/0281385 A1 | 11/2010 | Meaney |
| 2010/0281386 A1 | 11/2010 | Lyons |
| 2010/0287476 A1 | 11/2010 | Sakai |
| 2010/0299630 A1 | 11/2010 | McCutchen |
| 2010/0318660 A1 | 12/2010 | Balsubramanian |
| 2010/0321471 A1 | 12/2010 | Casolara |
| 2011/0025847 A1 | 2/2011 | Park |
| 2011/0069148 A1 | 3/2011 | Jones |
| 2011/0069189 A1 | 3/2011 | Venkataraman |
| 2011/0075990 A1 | 3/2011 | Eyer |
| 2011/0093798 A1 | 4/2011 | Shahraray |
| 2011/0134240 A1 | 6/2011 | Anderson |
| 2011/0173565 A1 | 7/2011 | Ofek |
| 2011/0206351 A1 | 8/2011 | Givoly |
| 2011/0211040 A1 | 9/2011 | Lindemann |
| 2011/0258049 A1 | 10/2011 | Ramer |
| 2011/0258547 A1 | 10/2011 | Symons |
| 2011/0276881 A1 | 11/2011 | Keng |
| 2011/0293250 A1 | 12/2011 | Deever |
| 2011/0320322 A1 | 12/2011 | Roslak |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0127169 A1 | 5/2012 | Barcay |
| 2012/0206565 A1 | 8/2012 | Villmer |
| 2012/0311448 A1 | 12/2012 | Achour |
| 2013/0024805 A1 | 1/2013 | In |
| 2013/0044108 A1 | 2/2013 | Tanaka |
| 2013/0058532 A1 | 3/2013 | White |
| 2013/0063561 A1 | 3/2013 | Stephan |
| 2013/0078990 A1 | 3/2013 | Kim |
| 2013/0127636 A1 | 5/2013 | Aryanpur |
| 2013/0136193 A1 | 5/2013 | Hwang |
| 2013/0142384 A1 | 6/2013 | Ofek |
| 2013/0145269 A1 | 6/2013 | Latulipe |
| 2013/0151970 A1 | 6/2013 | Achour |
| 2013/0166303 A1 | 6/2013 | Chang |
| 2013/0191743 A1 | 7/2013 | Reid |
| 2013/0195429 A1 | 8/2013 | Fay |
| 2013/0197967 A1 | 8/2013 | Pinto |
| 2013/0208134 A1 | 8/2013 | Hamalainen |
| 2013/0208942 A1 | 8/2013 | Davis |
| 2013/0215220 A1 | 8/2013 | Wang |
| 2013/0227415 A1 | 8/2013 | Gregg |
| 2013/0259399 A1 | 10/2013 | Ho |
| 2013/0263002 A1 | 10/2013 | Park |
| 2013/0283301 A1 | 10/2013 | Avedissian |
| 2013/0287214 A1 | 10/2013 | Resch |
| 2013/0287304 A1 | 10/2013 | Kimura |
| 2013/0300939 A1 | 11/2013 | Chou |
| 2013/0308921 A1 | 11/2013 | Budzinski |
| 2013/0318443 A1 | 11/2013 | Bachman |
| 2013/0343727 A1 | 12/2013 | Rav-Acha |
| 2014/0023341 A1 | 1/2014 | Wang |
| 2014/0026156 A1 | 1/2014 | Deephanphongs |
| 2014/0043340 A1 | 2/2014 | Sobhy |
| 2014/0064706 A1 | 3/2014 | Lewis, II |
| 2014/0072285 A1 | 3/2014 | Shynar |
| 2014/0093164 A1 | 4/2014 | Noorkami |
| 2014/0096002 A1 | 4/2014 | Dey |

(56) References Cited

U.S. PATENT DOCUMENTS

| | | |
|---|---|---|
| 2014/0105573 A1 | 4/2014 | Hanckmann |
| 2014/0161351 A1 | 6/2014 | Yagnik |
| 2014/0165119 A1 | 6/2014 | Liu |
| 2014/0169766 A1 | 6/2014 | Yu |
| 2014/0176542 A1 | 6/2014 | Shohara |
| 2014/0181666 A1 | 6/2014 | Moore |
| 2014/0193040 A1 | 7/2014 | Bronshtein |
| 2014/0212107 A1 | 7/2014 | Saint-Jean |
| 2014/0219634 A1 | 8/2014 | McIntosh |
| 2014/0226953 A1 | 8/2014 | Hou |
| 2014/0232818 A1 | 8/2014 | Carr |
| 2014/0232819 A1 | 8/2014 | Armstrong |
| 2014/0245336 A1 | 8/2014 | Lewis, II |
| 2014/0300644 A1 | 10/2014 | Gillard |
| 2014/0328570 A1 | 11/2014 | Cheng |
| 2014/0341528 A1 | 11/2014 | Mahate |
| 2014/0366052 A1 | 12/2014 | Ives |
| 2014/0376876 A1 | 12/2014 | Bentley |
| 2015/0015680 A1 | 1/2015 | Wang |
| 2015/0022355 A1 | 1/2015 | Pham |
| 2015/0029089 A1 | 1/2015 | Kim |
| 2015/0058709 A1 | 2/2015 | Zaletel |
| 2015/0085111 A1 | 3/2015 | Lavery |
| 2015/0154452 A1 | 6/2015 | Bentley |
| 2015/0178915 A1 | 6/2015 | Chatterjee |
| 2015/0186073 A1 | 7/2015 | Pacurariu |
| 2015/0220504 A1 | 8/2015 | Alvarez |
| 2015/0254871 A1 | 9/2015 | Macmillan |
| 2015/0256746 A1 | 9/2015 | Macmillan |
| 2015/0256808 A1 | 9/2015 | Macmillan |
| 2015/0271483 A1 | 9/2015 | Sun |
| 2015/0287435 A1 | 10/2015 | Land |
| 2015/0294141 A1 | 10/2015 | Molyneux |
| 2015/0318020 A1 | 11/2015 | Pribula |
| 2015/0339324 A1 | 11/2015 | Westmoreland |
| 2015/0375117 A1 | 12/2015 | Thompson |
| 2015/0382083 A1 | 12/2015 | Chen |
| 2016/0005435 A1 | 1/2016 | Campbell |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0088287 A1 | 3/2016 | Sadi |
| 2016/0098941 A1 | 4/2016 | Kerluke |
| 2016/0119551 A1 | 4/2016 | Brown |
| 2016/0217325 A1 | 7/2016 | Bose |
| 2016/0225405 A1 | 8/2016 | Matias |
| 2016/0225410 A1 | 8/2016 | Lee |
| 2016/0234345 A1 | 8/2016 | Roberts |
| 2016/0247535 A1 | 8/2016 | Latulipe |
| 2016/0358603 A1 | 12/2016 | Azam |
| 2016/0366330 A1 | 12/2016 | Boliek |
| 2017/0006214 A1 | 1/2017 | Andreassen |
| 2017/0062016 A1 | 3/2017 | Samra |
| 2017/0242504 A1 | 8/2017 | Hanson |
| 2017/0256288 A1* | 9/2017 | Ai ................ G11B 27/036 |

OTHER PUBLICATIONS

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structAVP a ck et. html>.

Han et al., Deep Compression: Compressing Deep Neural Networks with Pruning, Trained Quantization and Huffman Coding, International Conference on Learning Representations 2016, 14 pgs.

He et al., 'Deep Residual Learning for Image Recognition,' arXiv:1512.03385, 2015, 12 pgs.

Iandola et al., 'SqueezeNet: AlexNet-level accuracy with 50x fewer parameters and <0.5MB model size', arXiv:1602.07360v3 [cs.CV] Apr. 6, 2016 (9 pgs.).

Ioffe et al., 'Batch Normalization: Accelerating Deep Network Training by Reducing Internal Covariate Shift,' arXiv:1502.03167, 2015, 11 pgs.

Parkhi et al., 'Deep Face Recognition,' Proceedings of the British Machine Vision, 2015, 12 pgs.

PCT International Preliminary Report on Patentability for PCT/US2015/023680, dated Oct. 4, 2016, 10 pages.

PCT International Search Reort for PCT/US15/18538 dated Jun. 16, 2015 (2 pages).

PCT International Search Report and Written Opinion for PCT/US15/12086 dated Mar. 17, 2016, 20 pages.

PCT International Search Report and Written Opinion for PCT/US15/18538, dated Jun. 16, 2015, 26 pages.

PCT International Search Report and Written Opinion for PCT/US16/31076, dated Aug. 8, 2016, 19 Pages.

PCT International Search Report for PCT/US15/23680 dated Aug. 3, 2015, 4 pages.

PCT International Search Report for PCT/US15/41624 dated Nov. 4, 2015, 5 pages.

PCT International Search Report for PCT/US17/16367 dated Apr. 14, 2017 (2 pages).

PCT International Written Opinion for PCT/US2015/041624, dated Dec. 17, 2015, 7 Pages.

Ricker, 'First Click: TomTom's Bandit camera beats GoPro with software' Mar. 9, 2016 URL: http://www.theverge.com/2016/3/9/11179298/tomtom-bandit-beats-gopro (6 pages).

Schroff et al., 'FaceNet: A Unified Embedding for Face Recognition and Clustering,' IEEE Conference on Computer Vision and Pattern Recognition (CVPR), 2016, 10 pgs.

Tran et al., 'Learning Spatiotemporal Features with 3D Convolutional Networks', arXiv:1412.0767 [cs.CV] Dec. 2, 2014 (9 pgs).

Yang et al., 'Unsupervised Extraction of Video Highlights via Robust Recurrent Auto-encoders' arXiv:1510.01442v1 [cs.CV] Oct. 6, 2015 (9 pgs).

Transmittal of the International Search Report and the Written Opinion of the International Searching Authority for PCTA US2012/050155 dated Oct. 22, 2012, 7 pages.

Transmittal of the International Preliminary Report on Patentability for PCT/US2012/050155 dated Feb. 20, 2014, 6 pages.

\* cited by examiner

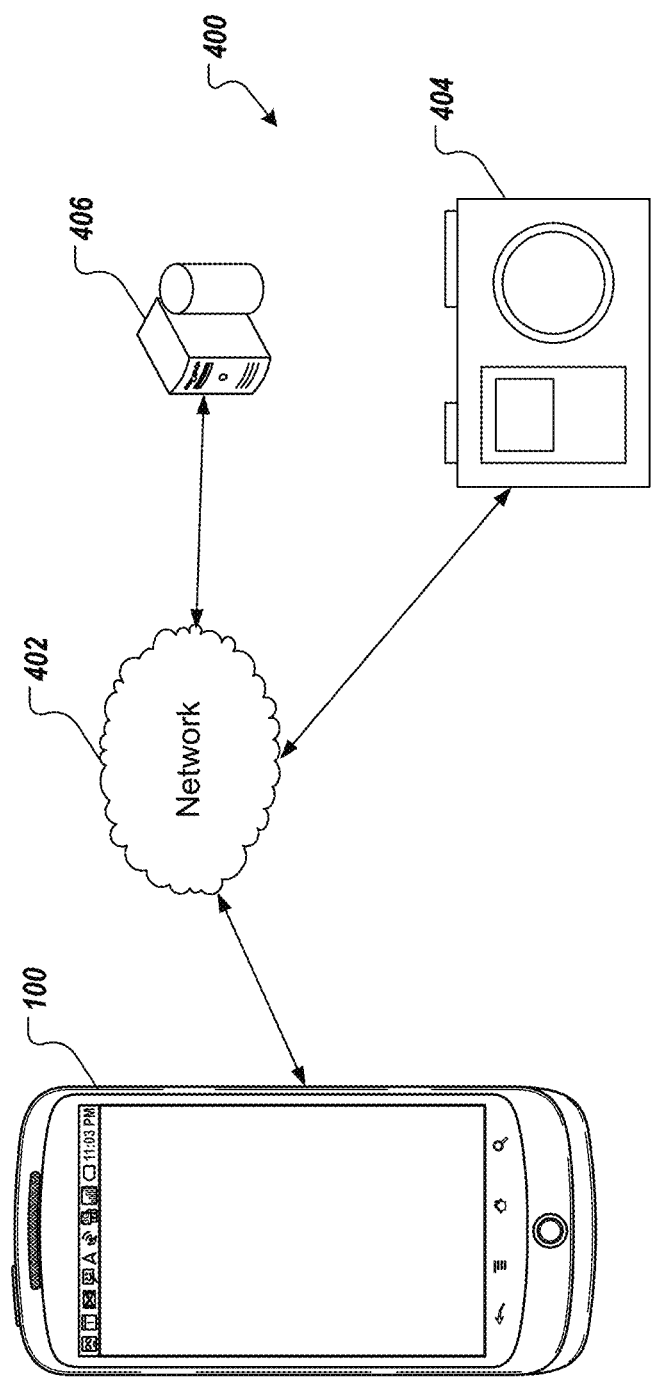

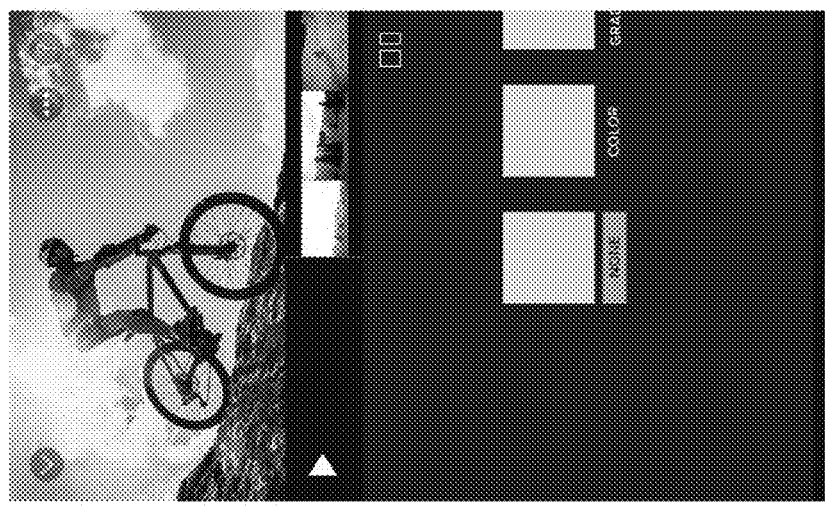
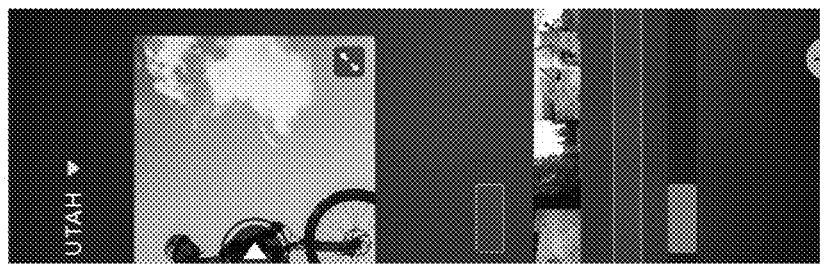

DIGITAL MEDIA EDITING

CROSS-REFERENCE TO RELATED APPLICATIONS

This application claims the benefit of U.S. 62/276,627, filed Jan. 8, 2016, and U.S. 62/291,336, filed Feb. 4, 2016, the disclosures of which are incorporated herein by reference in their entireties.

SUMMARY

This specification generally relates to digital media editing particularly for mobile processing devices.

In some implementations, actions include providing a digital media editing environment for editing at least a portion of a first digital video using a mobile device, establishing communication between the mobile device and a data source, receiving, from the data source, a first portion of the first digital video, the first portion including a first set of frames including less than all frames of the first digital video, applying at least one edit to the first portion of the first digital video, while less than all frames of the first digital video are stored on the mobile device, subsequent to applying the at least one edit, receiving, from the data source, a second portion of the first digital video, the second portion including a second set of frames of the first digital video, and storing an edited digital video on the mobile device, the edited digital video including at least one frame of the first set of frames, at least one frame of the second set of frames, and the at least one edit. Other embodiments of these aspects include corresponding systems, apparatus, and computer programs, configured to perform the actions of the methods, encoded on computer storage devices.

These and other embodiments may each optionally include one or more of the following features: the first portion of the digital video includes a low-resolution version of the digital video; the set of frames includes every $z^{th}$ frame of the digital video, where z is an integer that is greater than or equal to 2; the edited digital video includes less than all frames of the first digital video; less than all frames of the first digital video are received by the mobile device; the second set of frames includes frames of the first digital video that are absent from the first set of frames; the edited digital video includes at least a portion of a second digital video that is received by the mobile device; the data source comprises a media device; the data source comprises a server system that stores digital content; and the mobile device includes one of a tablet computing device, a smartphone, and a media device.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 4 depicts an example architecture in accordance with implementations of the present disclosure.

FIGS. 7A-7L depict example screenshots of a digital media editing application for mobile devices in accordance with implementations of the present disclosure.

Like reference numbers represent corresponding parts throughout.

DETAILED DESCRIPTION

Implementations of the present disclosure are generally directed to mobile device applications for enabling video editing to be performed on suitable mobile processing devices. Such mobile device applications can provide an object-based environment, in which distinct digital media units (e.g., still images, video clips, audio clips, etc.) can be imported and edited. These mobile device applications can also be operable to merge the imported digital media units into a unitary project based on modifications achieved in the editing environment.

Figure 1:
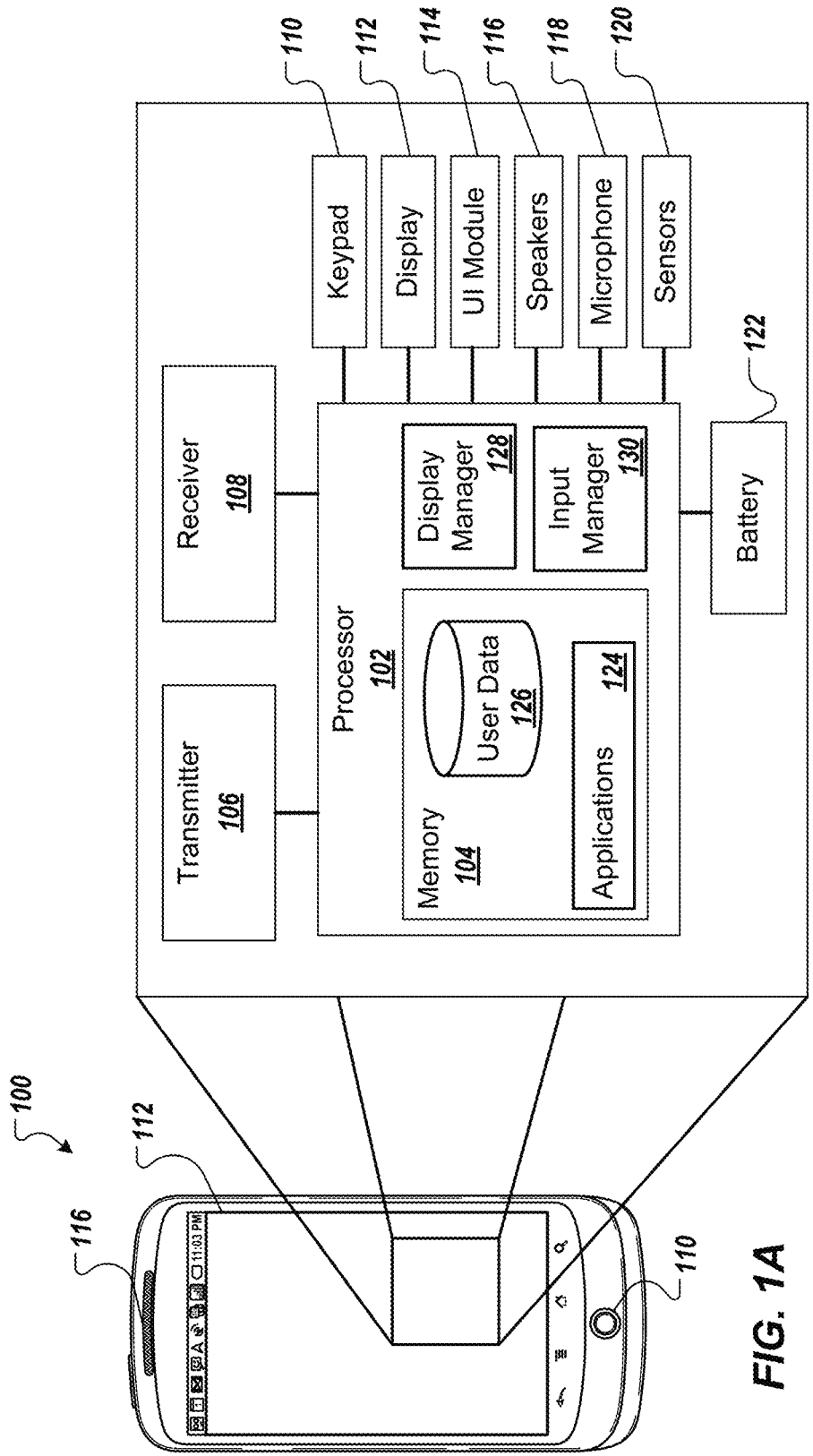
FIGS. 1A and 1B illustrate an example mobile processing device.

FIGS. 1A and 1B illustrate an example mobile processing device 100. In the depicted example, the mobile processing device 100 is provided as a smartphone. It is contemplated, however, implementations of the present disclosure can be realized using tablet computing devices, laptop computers, personal digital assistants (PDAs), mobile phones, or any one of many other known types of suitable mobile processing devices. In the depicted example, the mobile processing device 100 includes one or more processors 102, memory 104 (e.g., computer-readable media, read-only memory (ROM), random access memory (RAM), flash memory, a removable memory card (e.g., SD card), a hard disk, or any combination thereof), a transmitter 106, a receiver 108, a keypad 110 (e.g., a soft key), a display 112, a user-interface (UI) module 114 (e.g., a graphical user interface module for touchscreen devices), speakers 116, a microphone 118, sensors 120, and a battery 122. In some examples, the processor 102 can control each component of the mobile processing device 100 and can access memory 104 to run applications 124, and/or retrieve user data 126, which can be stored in the memory. The transmitter 106 and the receiver 108 transmit and receive signals (e.g., via one or more antennas) to other communication devices, base stations, computers, satellites (e.g., GPS satellites), and/or wireless access points. The keypad 110, the display 112, the speaker 116, and the microphone 118 are input/output devices for communicating with a user. The battery 120 provides power to appropriate components of the mobile processing device.

In some examples, the processor 102 can include a display manager 128 and an input manager 130. The display manager 128 can be operable to manage displayed on the display 112. In some implementations, an operating system running on the mobile device 102 can use the display manager 128 to arbitrate access to the display 112 for a number of applications 124 running on the mobile processing device 100. In some examples, a number of applications 124 can run concurrently on the mobile processing device 100, with each application displayed to the user in respective windows on the display 112. In such examples, the display manager 128 can control which portions of each application 124 are displayed on the display 112. In some implementations, the display manager 128 can control the orientation (e.g., portrait orientation, landscape orientation) of the display 112. In some examples, the input manager 130 can be operable control the handling of data received from a user via one or more input devices of the mobile processing device 100. For example, the input manager 130 can determine which application 124 should be invoked as a result of user received input. In some implementations, the UI module 114 can coordinate with the input devices to a interpret user input. The interpreted input can be evaluated by the input manager 130 to determine which application 124 should be invoked.

Figure 2:
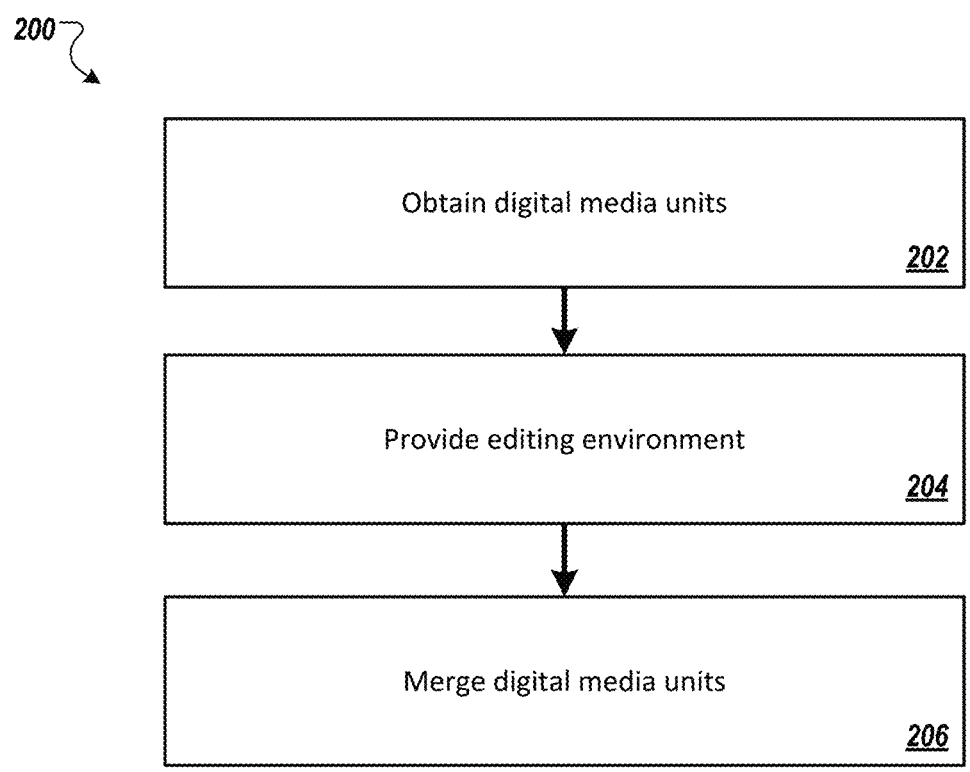
FIG. 2 depicts an example process for editing digital media that can be performed by a mobile device application running on the mobile processing device of FIGS. 1A and 1B.

FIG. 2 depicts an example process 200 for editing digital media that can be performed by one or more mobile device applications executed on the mobile processing device 100. As shown, the process 200 includes obtaining a plurality of digital media units (202). Digital media units can be obtained by any one of several suitable procedures. In some examples, a digital media unit can include a digital video file, a digital image file and/or a digital audio file. In some implementations, digital media units can be obtained by accessing the user data 126 stored in memory 104. That is, digital video files, digital image files and/or a digital audio files can be stored in memory 104. In some examples, the mobile device application can enable a user to utilize the input components to select one or more digital media units stored in memory 104. In some examples, the mobile device application can copy the selected digital media units and store them in a suitable directory, or simply reference their location in memory 104. In some implementations, and as described in further detail herein, digital media units can also be obtained through a communications link (e.g., a wired or wireless communications link). For example, the mobile device application can enable a user to utilize the input components of mobile processing device 100 to select specific media units for downloading from a remote server or a computing system (e.g., a personal computer communicatively coupled to mobile processing device 100). The downloaded digital media units can be stored in memory 104. In some examples, digital media units can be created using and stored to the mobile processing device 100. For example, a digital camera can be used to capture digital images and/or digital video and store them as digital files on the mobile processing device 100. As another example, a microphone of the mobile processing device 100 can capture audio and store it in a digital audio file.

The process 200 also includes providing an editing environment (204). In some examples, the editing environment is an object-based editing environment. In such examples, obtained digital media units can be represented as discrete objects arranged in the editing environment. In some implementations, a number of the discrete objects are arranged linearly by the mobile device application in a prescribed or random order. In some implementations, the mobile device application can enable users to rearrange the objects within the editing environment by utilizing the input components of the mobile processing device 100. In some examples, the digital media units can be arranged linearly, end-to-end, or in an overlapping manner by users. The mobile device application can also enable users to introduce additional objects to the editing environment. For example, objects representing additional digital media units can be introduced. In some implementations, objects in the editing environment can represent elements other than digital media units. For example, objects can represent effects or actions (such as transitions) to be implemented. Such objects can be imported manually by users, or automatically by the mobile device application.

As shown, the process 200 further includes merging the obtained plurality of digital media units to form a substantially continuous digital media unit (206). For example individual video clips, audio clips, and/or or still images can be merged (merged still images may be provided in the form of a slide show where each image is displayed for a predetermined duration). In some implementations, the plurality of digital media units are stitched together piece-by-piece according to the arranged configuration of representative objects in the editing environment. Further, in some examples, where an object in the editing environment represents a transition effect, the resulting "merge" of the pre-input media and the post-input media for that transition can be created based on the type of transition selected. The amount of overlap can be defined by the duration property for that transition object.

FIGS. 3A-3F depict the mobile processing device 100 running an example mobile device application (e.g., an application 124 stored in memory 104). As shown (for example in FIGS. 3A-3C), the mobile device application presents an editing environment 302 to users via the display 112 of the mobile processing device 100. A number of discrete virtual objects 304 (e.g., 304*a* and 304*b*) are disposed in a linear configuration within the editing environment 302. In this example, the objects 304 represent distinct digital media units available from memory 104 of the mobile processing device 100. In some implementations, the objects 304 are movable within editing environment 302. Therefore, as described above, the objects 304 can be rearranged in any prescribed order by a user. For example, a "drag-and-drop" technique can be executed by a user to rearrange the objects 304.

As shown, the mobile device application can provide a menu bar 306 including a number of selectable menu items. For example, selecting menu item 308 ("Projects") enables a user to access previously saved projects (i.e., instances of editing environment 302), or to create new projects. Various projects can include representations of the same, or different, digital media units. Selecting menu item 310 enables the user to adjust any one of several default settings for the project (e.g., screen orientation, video or sound quality, etc.). Selecting menu item 312 enables the user to view a help file. The help file can include various resources such as troubleshooting techniques, software patch or version notes, etc. Selecting menu item 314 ("Preview") enables the user to observe a preliminary version, or preview of a merged digital media unit (as described in greater detail below). In this example, the menu bar 306 also includes selectable toggle items 316*a* ("Video") and 316*b* ("Audio") for defining the type of digital media units that are displayed for editing.

In some implementations, the mobile device application can also provide an overview bar 318. As shown, the overview bar 318 includes a number of respective selectable tiles 320 corresponding to each object 304 in the editing environment 302. In some examples, selecting any one of tiles 320 simultaneously selects the corresponding object 304 for detailed display in the editing environment 302.

In some examples, users can add representations of additional digital media units (or other content) to the editing environment 302. Users can also modify digital media units that are already represented in the editing environment 302. For example, and with reference to FIG. 3B, when an existing object (e.g., object 304a) is selected and displayed, various selectable editing icons are displayed within the editing environment 302. In the depicted embodiment, the editing icons include an insert icon 322a, an insert icon 322b and an editing icon 324. Selecting either of insertion icons 322a, 322b enables the user to insert a digital media unit into editing environment 302 before or after the displayed object, respectively. In some examples, a menu is displayed in response to user selection of an insertion icon 322a, 322b, which menu includes object, transition and title options. The user can select object from the menu to insert select a digital media object for insertion. The user can select transition from the menu to select a transition for insertion. The user can select title from the menu to input a title for insertion.

Selecting editing item 324 enables the user to modify the digital media unit represented by the selected object. In some implementations, selecting editing item 324 allows the user to access one or more contextual editing options. For example, when a selected object is representative of a video clip, the mobile device application enables users to: add and/or remove frames, adjust a default playback speed, pan and/or zoom (e.g., via the Ken Burns effect or traditional cropping), etc. Similarly, when the selected object is representative of a still image, the mobile device application enables the user to: pan and/or zoom (e.g., via the Ken Burns effect or traditional cropping), add filters, etc.

Figure 3A:
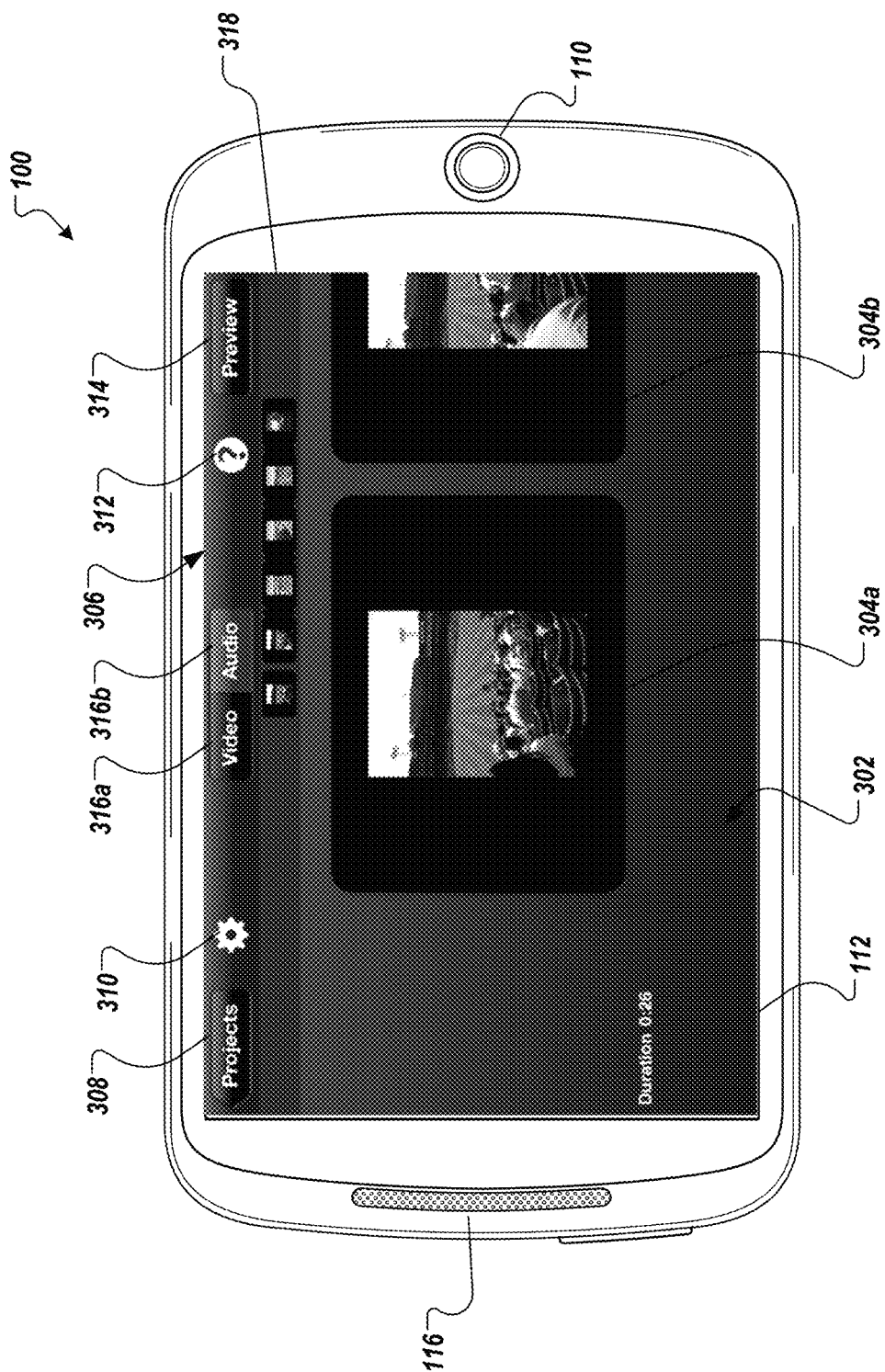
FIGS. 3A-3F depict the mobile processing device of FIGS. 1A and 1B running an example mobile device application.
Figure 3B:
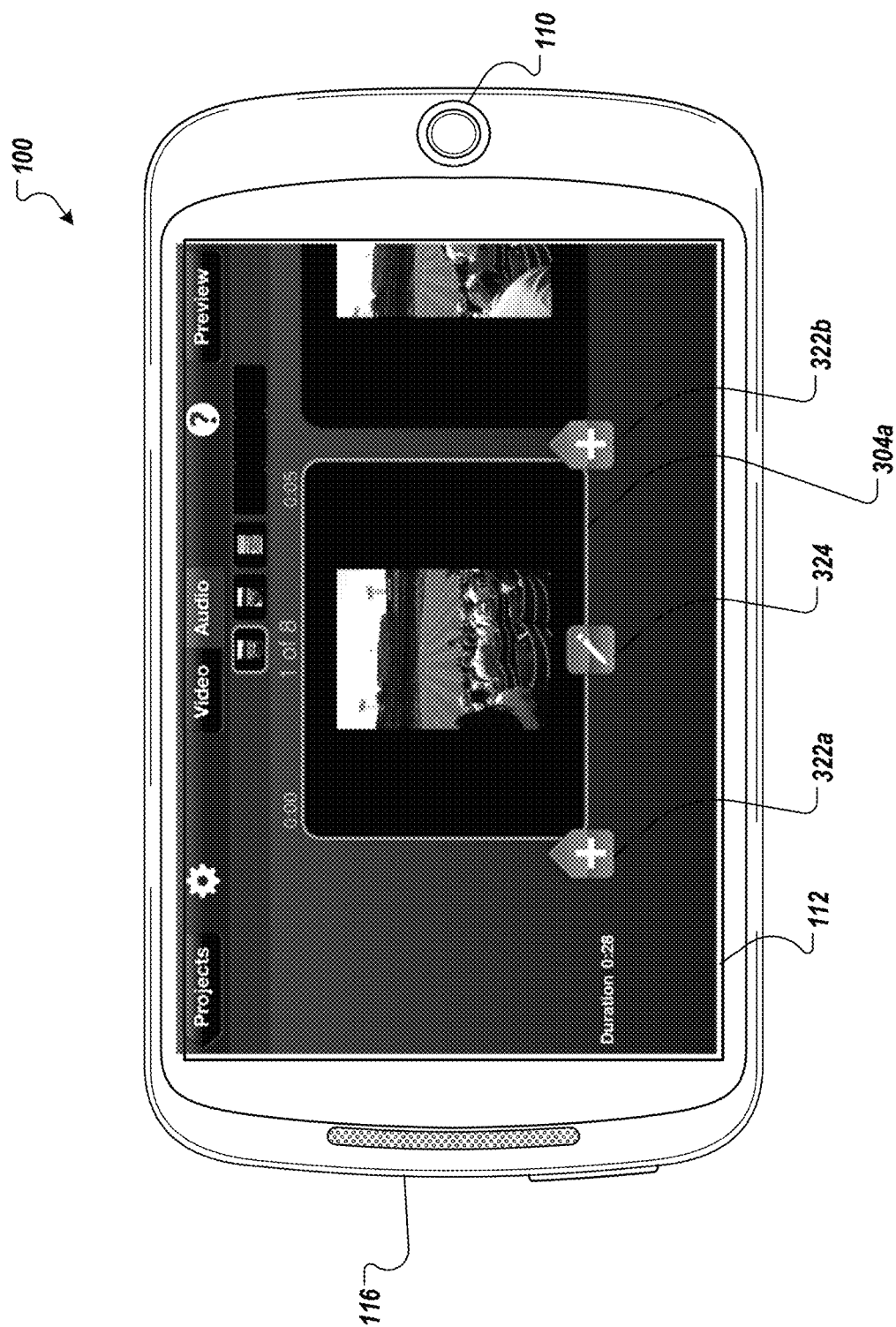
Figure 3C:
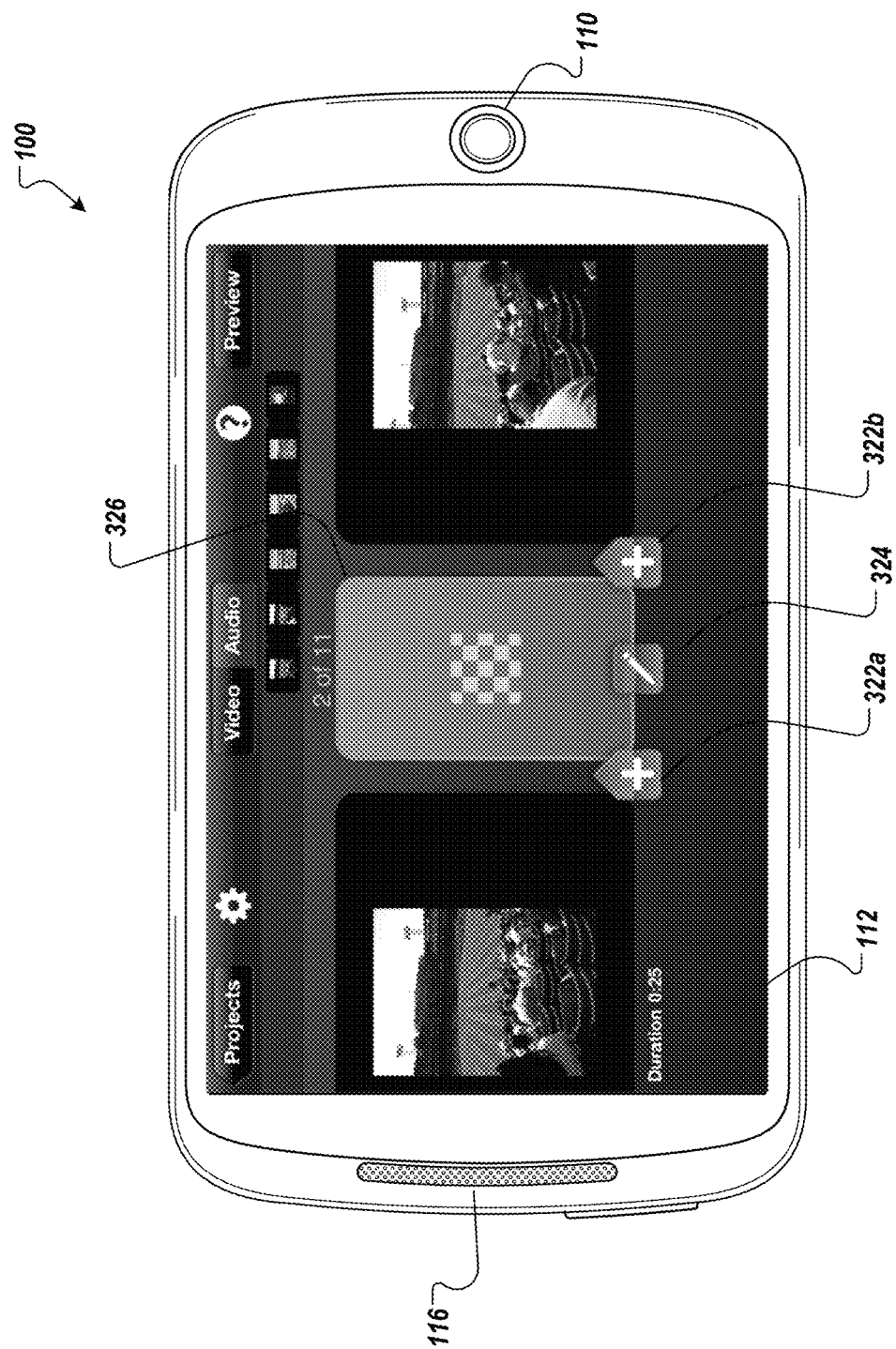

FIG. 3C shows a place holder for an additional object 326 to be imported into editing environment 302 and inserted between objects 304a and 304b. For example, the depiction of FIG. 3C is provided in response to user selection of the insert icon 322b of FIG. 3B, and making a selection from the displayed menu. In the depicted example, the object 326 can be representative of a transition effect to be inserted between the digital media units represented by the objects 304a and 304b. As noted above, the object 326 can be inserted manually by a user utilizing editing items 322a, 322b. In some examples, insertion of an object can be achieved automatically by the mobile device application. As shown, when the object 326 is selected, various selectable editing icons 322a, 322b, 324 are displayed within editing environment 302. Selecting either of editing items 322a, 322b enables the user to import additional content (e.g., additional representative objects) into editing environment 302.

Figure 3D:
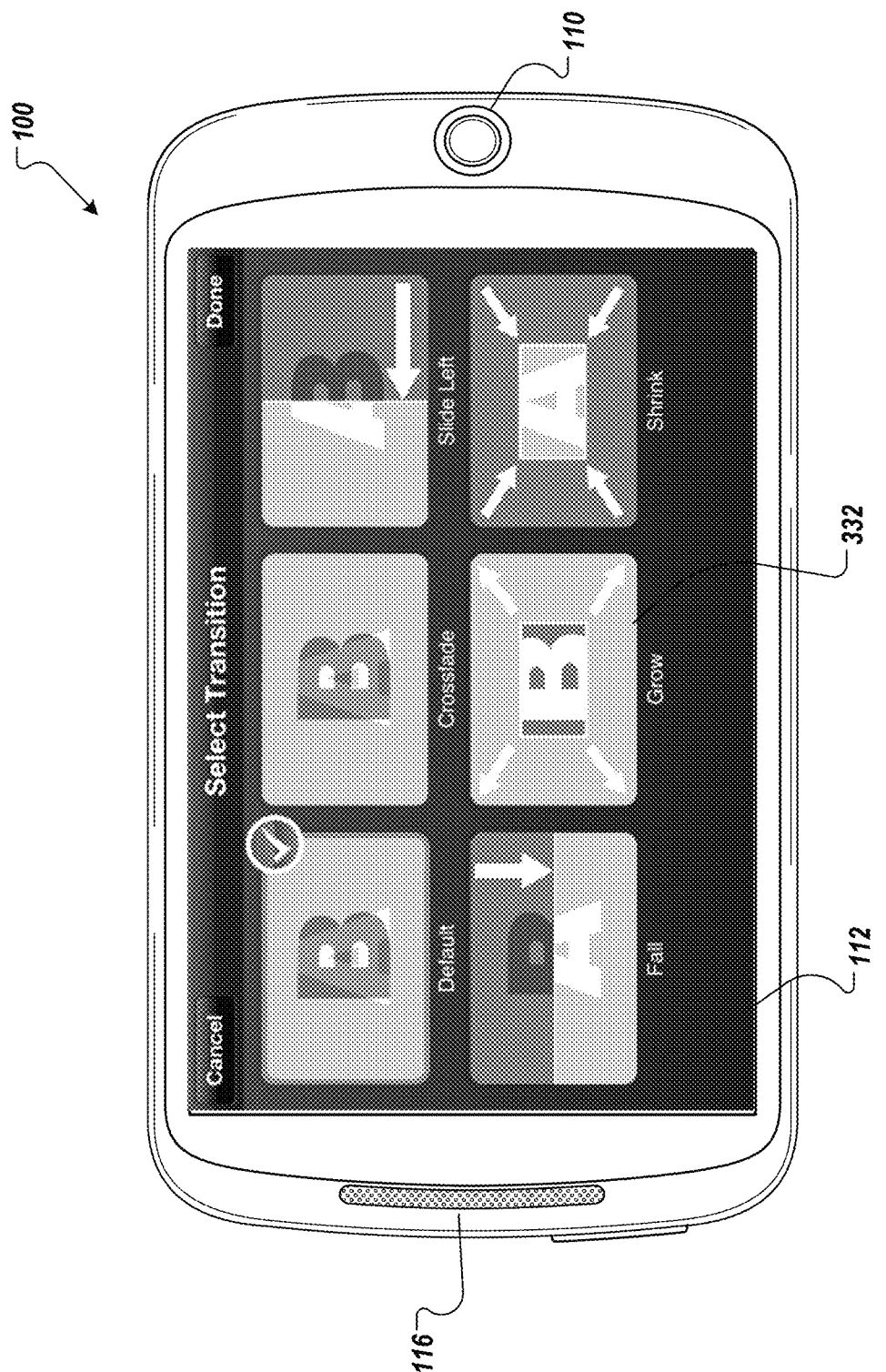

Selecting editing icon 324 enables the user to modify a default transition effect represented by object 326. FIG. 3D shows a menu of selectable items 332 for indicating a desired type of transition effect (e.g., "Default", "Cross-fade", "Slide Left", "Fall", "Grow", "Shrink", etc.). The transition effect provides a visual transition between objects when the video is played. In some implementations, the transitions represented by selectable items 332 are organized in a library stored in memory 104 of mobile processing device 100. In some examples, additional transitions can be added to the library (for example, additional transitions can be downloaded from a remote server or a computing system) and represented in the menu by additional selectable items.

Figure 3E:
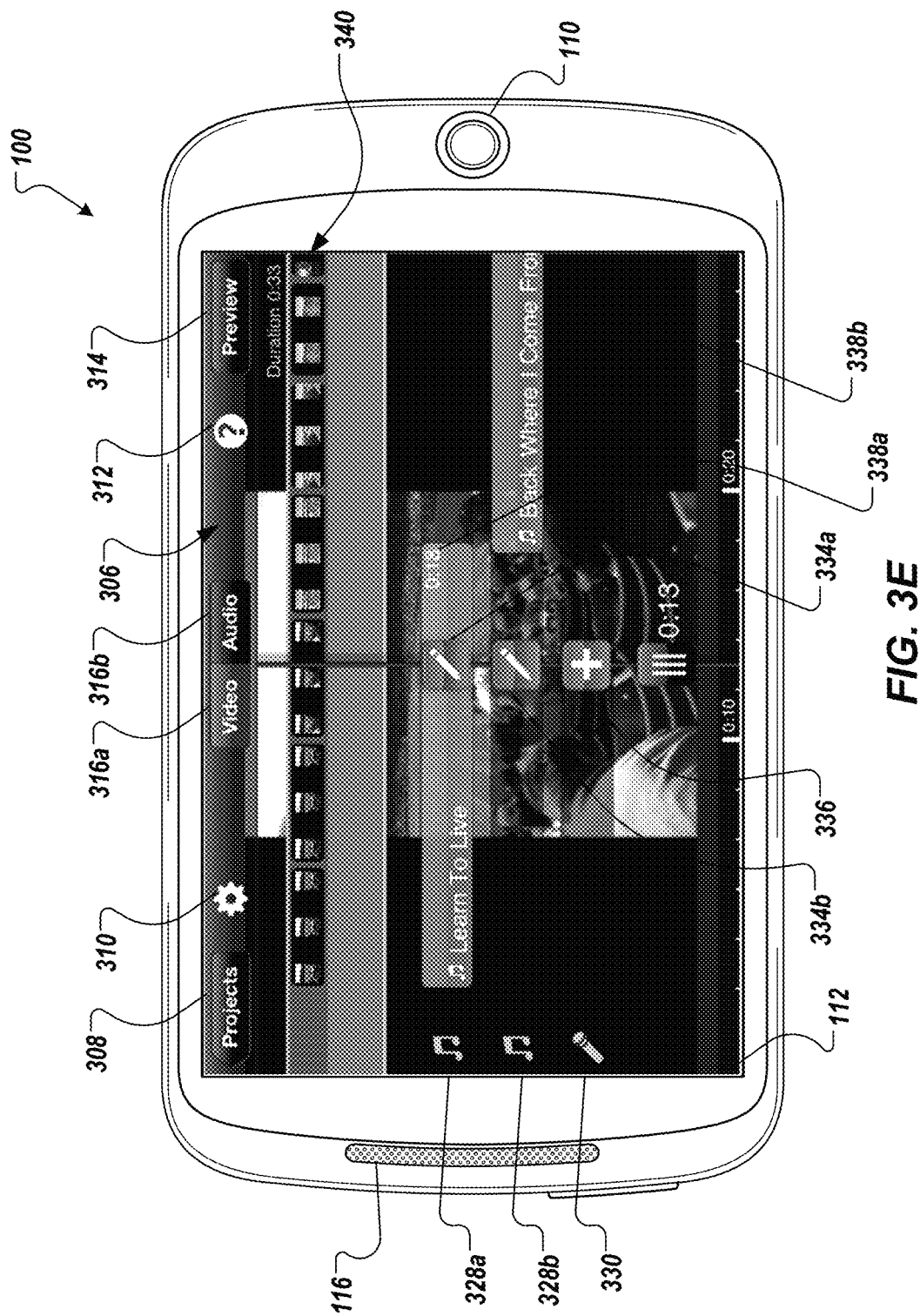

As described above, selectable toggle items 316a ("Video") and 316b ("Audio") can define the type of digital media units that are displayed for editing. FIG. 3E shows editing environment 302 when item 316b is selected. In the depicted example, audio slots 328a, 328b are provided and recording slot 330 is provided. The audio slots 328a, 328b can each be populated with an audio object. In the depicted example, the audio slots 328a, 328b are populated by audio objects represented by audio representations 338a, 338b, respectively, and the recording slot 330 is empty. In this example, audio representations 338a, 338b are provided in the form of linear segments aligned with a video timeline 340 (e.g., a frame-by-frame timeline). In some implementations, however, audio representations can be provided in the form of discrete objects that are movable within editing environment 302. In some example, when an audio slot is empty, an insert icon is displayed. In response to user selection of the insert icon, an audio object selection menu can be displayed, which the user can navigate to select an audio object for populating the audio slot.

Audio editing icons 334a, 334b, 336 are displayed. The audio editing icons 334a, 334b, 336 and audio representations 338a, 338b overlay frames of the objects that make up the video. Selecting either of editing icons 334a, 334b enables the user to edit an audio track represented by the audio representation 338a, 338b, respectively. In some examples, audio editing options include accelerating or decelerating the audio playback speed and/or setting start and end time points for the respective audio object relative to a timeline of the underlying video. Selecting icon 336 enables the user to record an audio file and import a representation of the recorded file into editing environment 302.

Figure 3F:
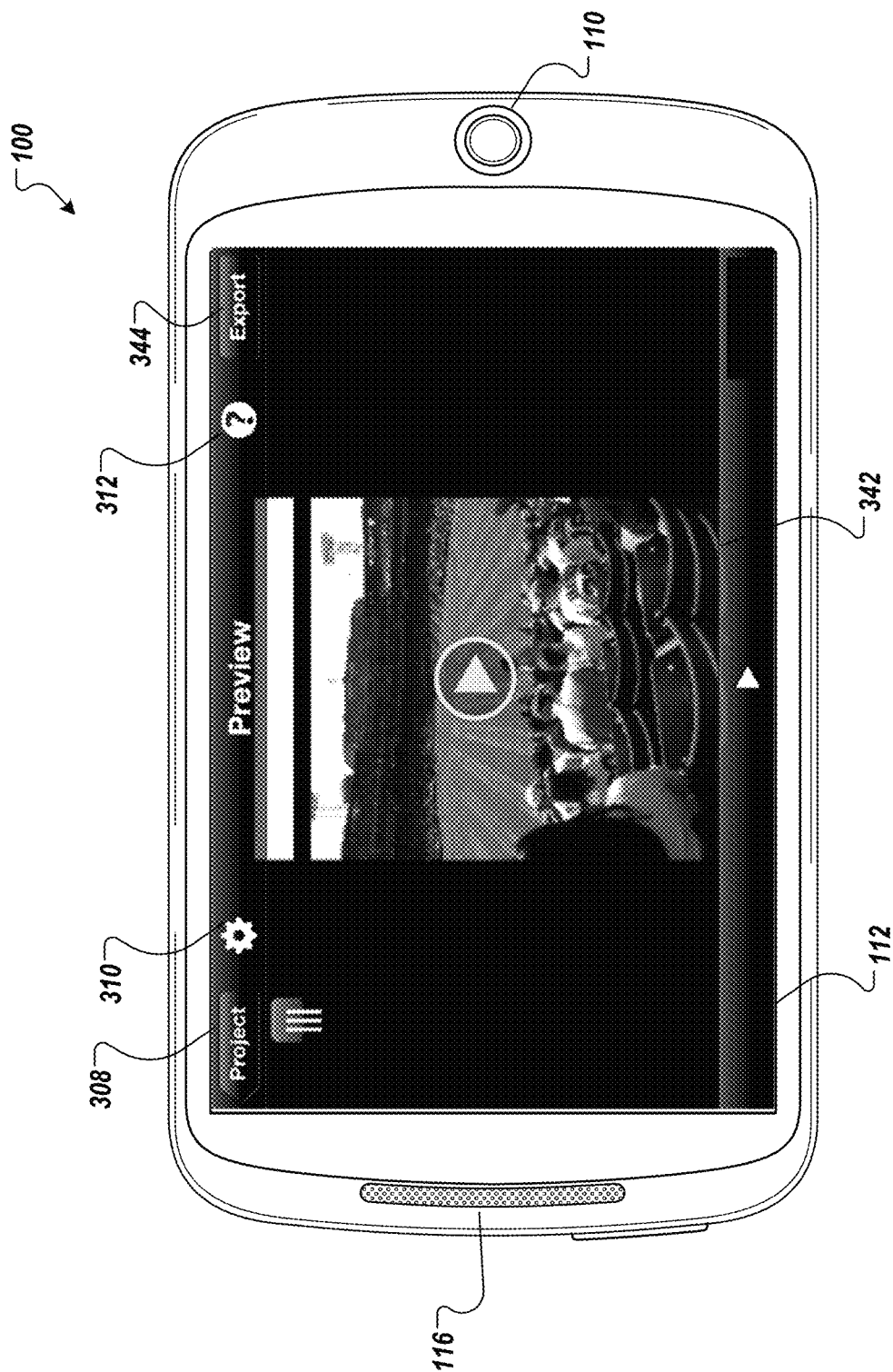

As described above, selecting the appropriate menu item enables the user to observe a preliminary version of the merged digital media unit. The merged digital media unit can include a combination of the digital media units and effects embodied by the representations imported into editing environment 302. In some implantations, a number of the digital media units and effects are combined in a chronological order prescribed by the arrangement of discrete objects in editing environment 302. FIG. 3F shows a preview screen presented to users via display 112 of mobile processing device 100. As shown, the preview screen includes a selectable media item 342. Selecting the media item can allow users to observe the merged digital media unit. Additionally, in this example, menu bar 306 includes selectable menu item 344 ("Export"), in addition to the various other menu items described above. Selecting menu item 344 can allow users to export the merged digital media unit to a specified location in memory 104 of mobile processing device 100.

FIG. 4 depicts an example architecture 400 in accordance with implementations of the present disclosure. In the depicted example, the architecture 400 includes a mobile processing device 100 (e.g., a smartphone, a tablet computing device), a network 402, a media device 404, and a server system 406.

In some examples, the media device 404 includes any appropriate device for generating and storing, among other functionality, digital media objects. An example media device can include a digital camera that can be used to capture digital images, video, and/or audio (as digital media objects). Example media devices include the GoPro Hero® series of digital video cameras provided by GoPro, Inc. In some examples, the media device 404 stores digital media objects in computer-readable memory. Example computer-readable memory can include removable memory, such as a non-volatile memory card (e.g., a secure digital (SD) storage care developed by the SD Card Association (SDA) for use in portable devices). In some examples, the server systems 406 includes one or more computing devices, and computer-readable memory, and can represent various forms of server systems including, but not limited to a web server, an application server, a proxy server, a network server, or a server farm.

In some examples, the media device 404 and/or the server system 406 store one or more digital media units (also referred to herein as digital media objects, or objects) (e.g., a digital video file, a digital image file, a digital audio file). For example, the server system 406 can host one or more computer-implemented services, which can be used (e.g., by a user of the mobile processing device 100) to, for example, store, share, and/or edit digital media objects. Example computer-implemented services can include a computer-implemented social networking service, a computer-implemented micro-blogging service, and a computer-implemented content-sharing service. An example social networking service can include Facebook® provided by Facebook, Inc. An example micro-blogging service can include Twitter® provided by Twitter Inc. Example content-sharing services include image-sharing services and/or video-sharing services. An example content-sharing service includes Instagram® provided by Facebook, Inc. It is contemplated, however, that implementations of the present disclosure can be realized in any appropriate computer-implemented services (e.g., multiple social networking services, multiple micro-blogging services, multiple content-sharing services, and/or any other appropriate computer-implemented service).

In some examples, the mobile processing device 100 communicates with the media device 404, and/or the server system 406 over the network 402 to access objects stored thereby. In some examples, the network 402 can be a public communication network (e.g., the Internet, cellular data network, dialup modems over a telephone network), a wide area network (WAN), a local area network (LAN), a private communications network (e.g., private LAN, leased lines), a wireless network, a wireless connection between devices, or any appropriate combination thereof. In one example, the mobile processing device 100 can communicate with the media device 404 over the network 402 (e.g., as a wireless connection (WiFi, Bluetooth)) to access objects stored by the media device 404. In another example, the mobile processing device 100 can communicate with the server system 406 over the network 402 (e.g., the Internet) to access objects stored by the server system 406.

In some implementations, the mobile processing device 100 and/or the media device 404 can execute a digital media editing application to enable a user to create, edit, and store a digital media project (e.g., a digital video). In accordance with implementations of the present disclosure, the digital media project can include objects and/or portions of objects stored on the mobile processing device 100, on the media device 404, and/or the server system 406. As described in further detail herein, implementations of the present disclosure enable an object provided on the media device 404, and/or the server system 406 to be edited using the digital media editing application of the mobile processing device 100, before the object (or a portion of the object) is downloaded from the media device 404, and/or the server system 406 to the mobile processing device 100. In some implementations, an object provided on the mobile processing device 100, and/or the server system 406 can be edited using a digital media editing application executed on the media device 404, before the object (or a portion of the object) is downloaded from the mobile processing device 100, and/or the server system 406 to the media device. Although implementations of the present disclosure include editing digital media on either the mobile processing device 100, and/or the media device 404, implementations will be described in further detail herein with reference to editing digital media on the mobile processing device 100.

In accordance with implementations of the present disclosure, downloading of objects from the media device 404, and/or the server system 406 to the mobile processing device 100 need not be performed before editing the objects using the digital media editing application. This enables resources (e.g., processors, memory, communication bandwidth) to be conserved. For example, an object stored on the media device 404, and/or the server system 406 can be relatively large (e.g., 10 MB, 100 MB, 1 GB). The mobile processing device 100 can communicate with the media device 404, and/or the server system 406 to edit an object and create a sub-object from the object using the digital media editing application. In some examples, the sub-object is smaller than the object, from which the sub-object was created. After the sub-object has been created, the sub-object (as opposed to the object) can be downloaded to the mobile processing device 100 for inclusion in a digital media project. Because the sub-object is smaller than the object, resources used to download and store the sub-object are conserved (e.g., less communication bandwidth is required to download the sub-object than the object; less memory is required of the mobile processing device 100 to store the sub-object than the object).

Implementations of the present disclosure also provide low-resolution editing of an object (or sub-object) before a high-resolution object (or sub-object) is downloaded to the mobile processing device 100. In some examples, an object (or sub-object) can be selected for editing. For example, the user can use the digital media editing application executing on the mobile processing device 100 to select an object (or sub-object) that is stored on the media device 404. In another example, the user can use the digital media editing application executing on the mobile processing device 100 to select an object (or sub-object) that is stored on the server system 406.

In some implementations, in response to user selection of the object, a low-resolution version of the object is downloaded to the mobile processing device 100. In some examples, the low-resolution object has a lower fidelity than the high-resolution object. For example, the high-resolution object can include a digital video that includes X frames (e.g., 5400 frames for a 3-minute digital video recorded at 30 frames-per-second (FPS)). In some examples, the low-resolution object can include the digital video with Y frames, where Y is less than X (e.g., 900 frames of the original 5400 frames). In some examples, the low-resolution object includes the same number of frames as the high-resolution object, but one or more frames of the low-resolution object is of a lower resolution than the respective one or more frames of the high-resolution object. For example, a frame of the high-resolution object can be provided at a first pixel count, and a respective frame of the low-resolution object can be provided at a second pixel count that is lower than the first pixel count. In some examples, the low-resolution object is provided from the high-resolution object. For example, the low-resolution object can be provided by filtering the high-resolution object to select every $z^{th}$ frame, where z is an integer that is $\geq 2$ (e.g., every $6^{th}$ frame). In some examples, every $z^{th}$ frame is removed, or is converted to a lower resolution (e.g., from the first pixel count to the second pixel count).

In some implementations, the low-resolution object is automatically provided upon creation of the high-resolution object. For example, in response to creation of the high-resolution object (e.g., completed recording of a digital video), the low-resolution object is created (e.g., by the media device 404, or the server system 406). In some implementations, the low-resolution object is provided in response to user selection of the high-resolution object for editing. For example, in response to user selection of the high-resolution object, the low-resolution object is created (e.g., by the media device 404, or the server system 406).

In some implementations, the low-resolution object is downloaded to the mobile processing device 100, and a graphical representation of the low-resolution object is displayed in the digital media editing application. In some examples, the user can edit the low-resolution object, as described herein. For example, the user can use the digital media editing application to apply one or more edits (e.g., clip, slow motion, fast forward, zoom, etc.) to the low-resolution object. In some examples, an edit is associated with two or more frames of the low-resolution object. In some examples, a beginning of the edit is associated with a first frame, and an end of the edit is associated with a second frame (e.g., the duration of the edit is from the first frame to the second frame). In some examples, an edit is associated with a single frame. In some implementations, a set of edits for the low-resolution object is provided and includes one or more edits, each edit being associated with at least one frame (e.g., each edit being keyed to at least one frame based on unique identifiers of the frames, described in further detail herein).

In some implementations, the set of edits is applied to the high-resolution object. In some examples, the set of edits is applied to the high-resolution object (or portion thereof) downloaded to the mobile processing device 100. In some examples, the set of edits is uploaded to the location where the high-resolution object is stored (e.g., the media device 404, or the server system 406), and the set of edits is applied to the high-resolution object (or a copy of the high-resolution object) at the location (e.g., the set of edits is applied to the high-resolution object by the media device 404, or the server system 406). In this manner, an edited high-resolution object can be provided. The edited high-resolution object can be subsequently uploaded to, for example, one or more computer-implemented services (e.g., social networking service, micro-blogging service, content-sharing service), and/or downloaded to the mobile processing device 100.

In some implementations, download of the high-resolution object can occur during editing of the low-resolution object. For example, the low-resolution object can be downloaded to the mobile processing device 100, and editing of the low-resolution object can be undertaken. After download of the low-resolution object, the high-resolution object (or a portion thereof) can be downloaded to the mobile processing device, regardless of whether editing of the low-resolution object is complete. In some implementations, download of the high-resolution object can occur after editing of the low-resolution object. For example, the high-resolution object can be downloaded in response to completion of editing of the low-resolution object. In this manner, all frames of the high-resolution object need not be downloaded (e.g., in cases where frames were clipped out) reducing the amount of data transferred to the mobile processing device 100.

In some implementations, download of the high-resolution object only includes content (e.g., frames) that is absent from the low-resolution object (e.g., frames that were not already downloaded as the low-resolution object). For example, and considering a digital video, the high-resolution object includes X frames, and the low-resolution object includes Y frames of the X frames. Because the Y frames are already downloaded to the mobile processing device as part of the low-resolution object, only the remaining frames of the X frames need be downloaded to the mobile processing device 100 to recreate the high-resolution object at the mobile computing device (e.g., by integrating the Y frames with the remaining frames of the X frames). In effect, the high-resolution object (or portion thereof) is downloaded to the mobile processing device 100 in multiple components (e.g., a first component (the low-resolution object of Y frames), and a second component (the remaining frames (or portion) of the Z frames).

In some implementations, the high-resolution object, or portion thereof, is recreated on the mobile computing device 100 based on unique identifiers associated with the frames. In some examples, each of the X frames is assigned a respective unique identifier (e.g., by the device that recorded the high-resolution object). In some examples, a frame sequence is provided based on the unique identifiers, and defines a temporal order of the frames. In some examples, the Y frames of the low-resolution object, and the subsequently downloaded remaining frames of the X frames are put in the temporal order based on the unique identifiers. For example, frames of the high-resolution object can include unique identifiers $ID_1, ID_X$ (e.g., $ID_1, ID_{5400}$) in the temporal order 1, . . . , X (e.g., 1, . . . , 5400). In some examples, the low-resolution object includes Y frames of the X frames (e.g., every $z^{th}$ frame). For example, the low-resolution object includes frames with identifiers in the set $ID_{1+nZ}$, wherein n is an integer ≥0. Accordingly, the remaining frames of the X frames includes frames with identifiers not included in the set $ID_{1+nZ}$. When the remaining frames (or portion thereof) are received by the mobile processing device 100, the digital media editing application can integrate the frames based on the unique identifiers and the temporal order.

FIGS. 5A-5L depict example screenshots of a digital media editing application for mobile devices in accordance with implementations of the present disclosure.

Figure 5A:
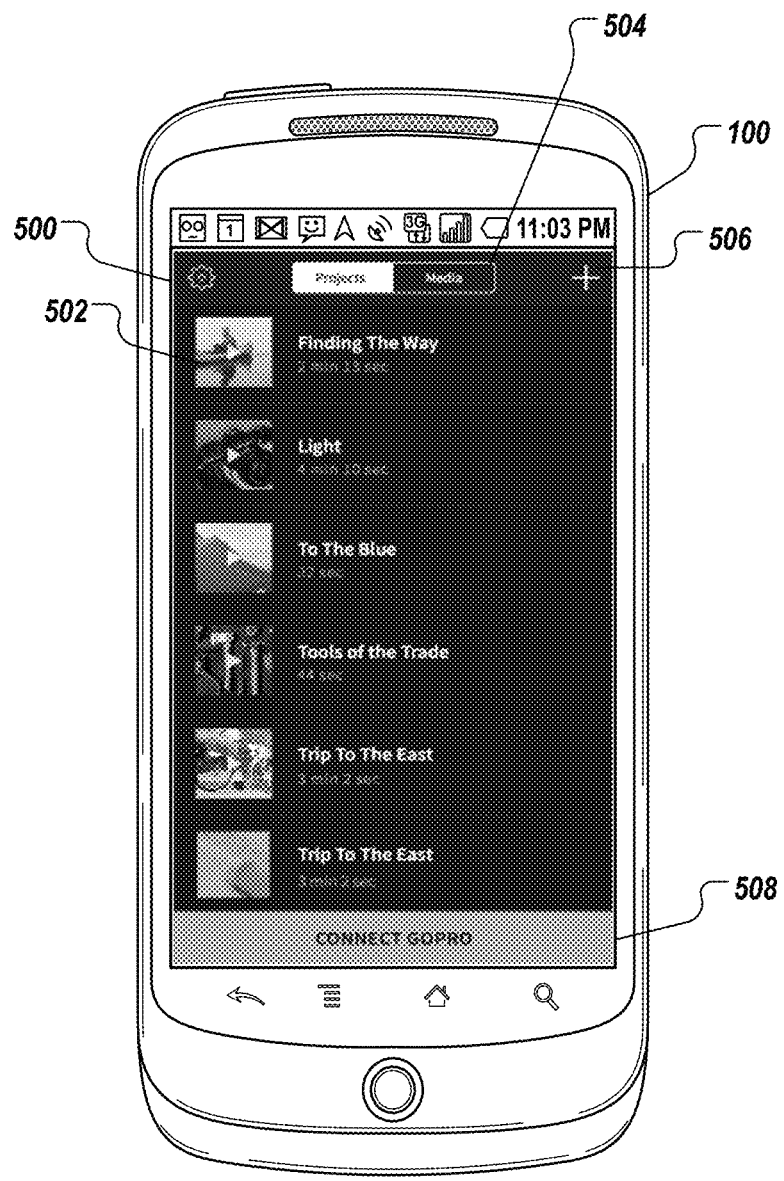
FIGS. 5A-5L depict example screenshots of a digital media editing application for mobile devices in accordance with implementations of the present disclosure.

FIG. 5A depicts an example projects screen 500. In the depicted example, the projects screen 500 provides graphical representations of digital media projects 502 that are stored on the mobile processing device 100. The projects screen 500 includes a selection interface 504 for switching between the projects screen 500, and a media screen (discussed below with reference to FIG. 5C). The projects screen 500 includes an add button 506, which can be selected to initiate a workflow for creating a new digital media project. The projects screen 500 also includes a media device connection button 508, which can be selected to initiate a workflow for connecting the mobile processing device 100 to a media device (e.g., the media device 402 of FIG. 4). In some examples, a graphical representation of a digital media project 502 can be selected to initiate view and/or editing of the digital media project 502.

Figure 5B:
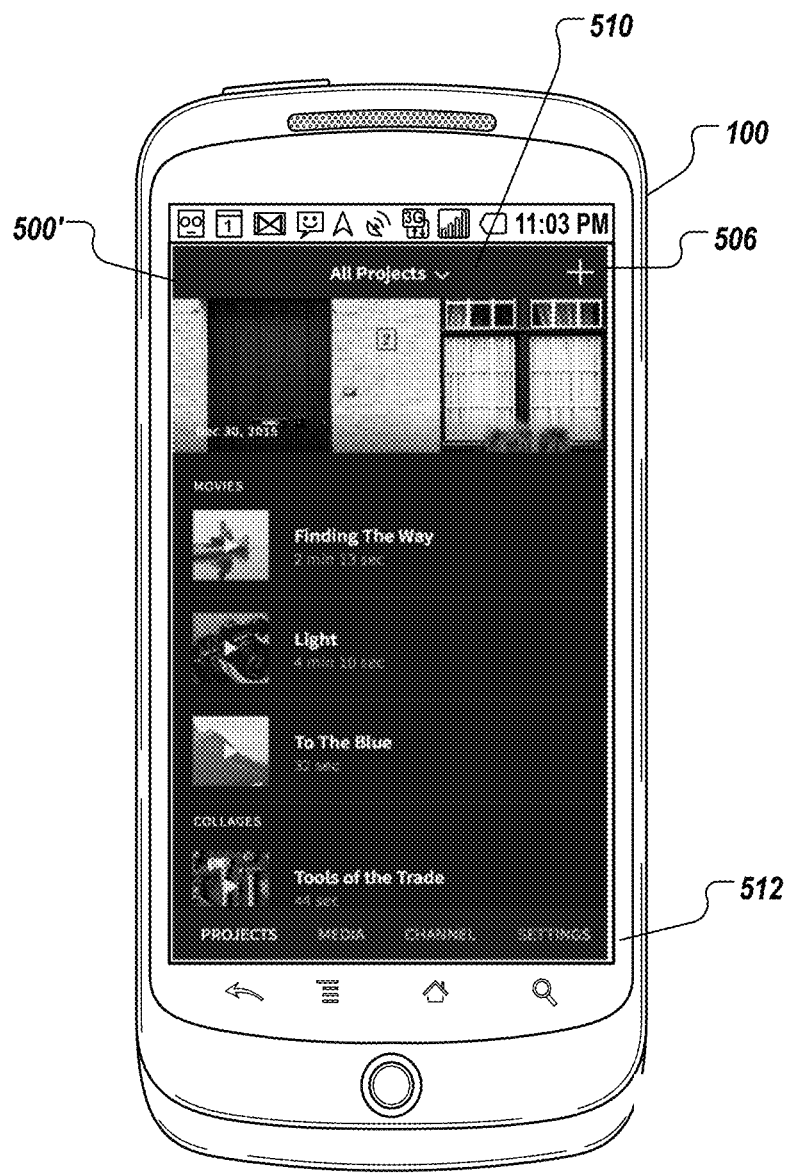

FIG. 5B depicts a modified version of the example projects screen 500'. In the depicted example, the projects screen 500' provides graphical representations of digital media projects 502 that are stored on the mobile processing device 100. The projects screen 500' also includes a filter interface 510 for filtering which digital media projects 502 are displayed on the projects screen 500'. In the depicted example, "All Projects" is selected. In some examples, the user can interact with the filter interface 510 to select a filter option (e.g., All Projects, Recent Projects, etc.) to change which digital media objects 500 are displayed. The projects screen 500' also includes source interface 512, which includes a plurality of options for selecting a source of digital media to be displayed in the projects screen 500'. Example sources include "Projects" (the digital media projects stored on the mobile processing device 100), "Media" (the digital media objects stored on the mobile processing device 100), and "Channel" (an external digital media source (e.g., the media device 402, computer-implemented services provided by the server system 406). The source interface 512 also includes a "Settings" option, which can be selected to display a settings screen.

Figure 5C:
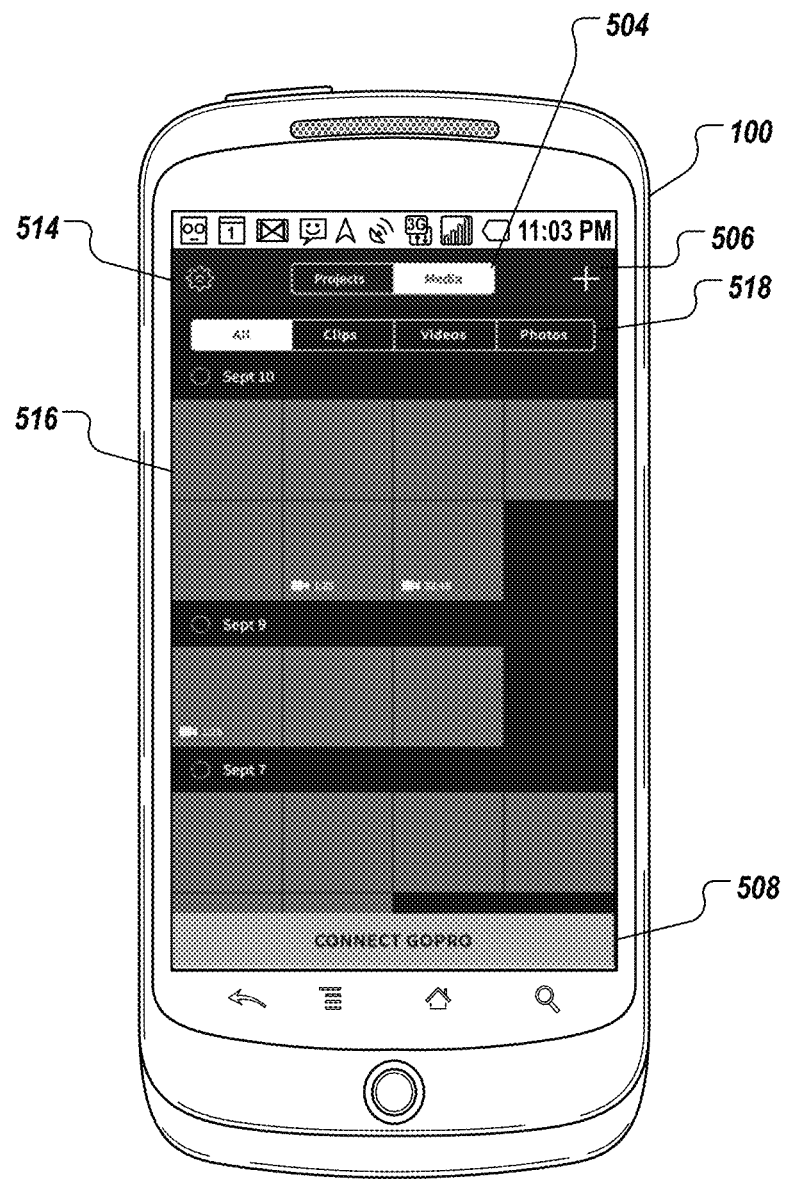

FIG. 5C depicts an example media screen 514. In the depicted example, the media screen 514 provides graphical representations of digital media objects 516 (e.g., images, video, audio) that are stored on the mobile processing device 100. The media screen 514 includes the selection interface 504 for switching between the projects screen 500, and the media screen 514. The media screen 514 includes the add button 506, and the media device connection button 508. In some examples, a graphical representation of a digital media object 516 can be selected to initiate view and/or editing of the digital media object 516, and/or creation of a digital media project based on the digital media object 516. The media screen 514 includes a media type selection interface 518, which includes a plurality of options for selecting a type of digital media objects to be displayed in the media screen 514. In the depicted example, the media type selection interface 518 includes an "All" option, which can be selected to display graphical representations of all digital media objects stored on the mobile processing device 100, a "Clips" option, which can be selected to display graphical representations of pre-defined clips (snippets, sub-objects) stored on the mobile processing device 100, a "Videos" option, which can be selected to display graphical representations of all video objects stored on the mobile processing device 100, and a "Photos" option, which can be selected to display graphical representations of all image objects stored on the mobile processing device 100.

Figure 5D:
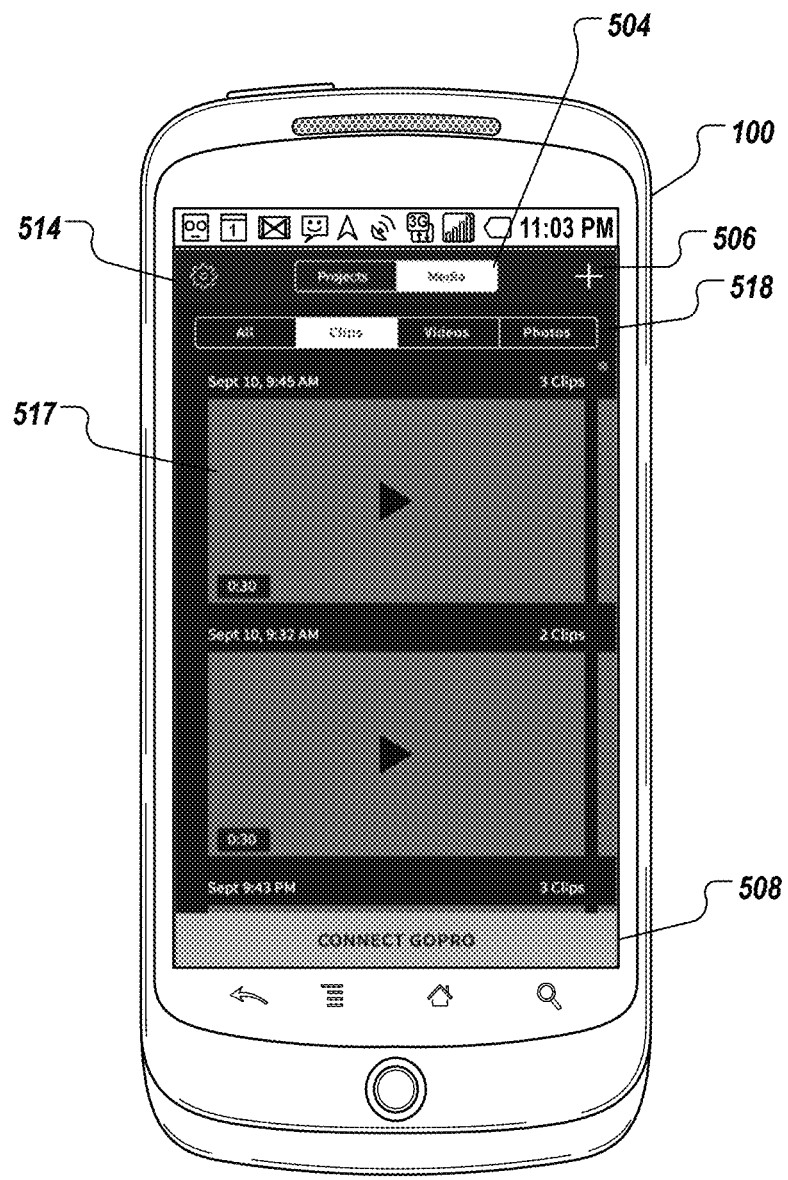

FIG. 5D depicts the example media screen 514 in response to selection of the "Clips" option from the media type selection interface 518. In the depicted example, the media screen 514 provides graphical representations of digital media objects 517 (e.g., snippets, sub-objects) that are stored on the mobile processing device 100.

Figure 5E:
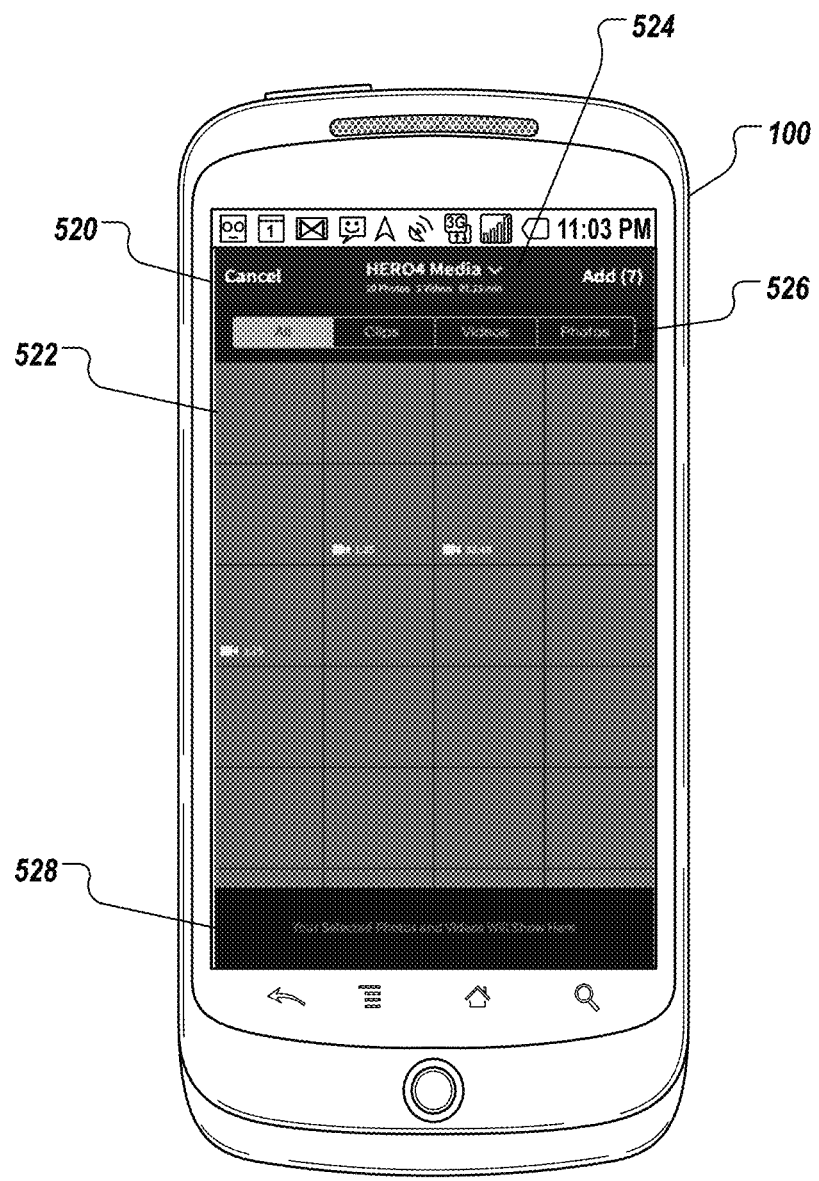

FIG. 5E depicts an example media device screen 520. In some examples, the media device screen 520 is displayed in response to establishing communication between the mobile processing device 100 and a media device (e.g., the media device 404 of FIG. 4). For example, the user can select the media device connection button 508 (e.g., of FIGS. 5A, 5C, 5D) to initiate a workflow for connecting to a media device. In some examples, in response to selection of the media device connection button 508, a connection screen can be displayed, which provides graphical representations of one or more media devices that are connectable (e.g., wirelessly) to the mobile processing device 100. In some examples, a media device is connectable, if it is on (or at least active for establishing communication), is registered with the digital media editing application, and/or is within range (e.g., depending on a wireless communication protocol/hardware) of the mobile processing device 100. The user can select a media device from the connection screen.

In the example of FIG. 5E, the media device screen 520 provides graphical representations of digital media objects 522 that are stored on the media device. The media device screen 520 includes a media device interface 524, which indicates the particular media device that the mobile computing device 100 is currently connected to. In some examples, the user can interact with the media device interface 524 to select another media device to connect to. The media device screen 520 includes a media type selection interface 526, which includes a plurality of options for selecting a type of digital media objects to be displayed in the media device screen 520. In the depicted example, the media type selection interface 526 includes an "All" option, which can be selected to display graphical representations of all digital media objects stored on the media device, a "Clips" option, which can be selected to display graphical representations of pre-defined clips (snippets, sub-objects) stored on the media device, a "Videos" option, which can be selected to display graphical representations of all video objects stored on the media device, and a "Photos" option, which can be selected to display graphical representations of all image objects stored on the media device. The media device screen 520 includes a selected objects interface 528. In some examples, the selected objects interface 528 depicts graphical representations of digital media objects selected by the user. For example, the user can select a graphical representation of a digital media object 522 from the media device screen 520, and in response, the graphical representation is displayed on the selected objects interface. In some examples, the selected objects interface 528 depicts graphical representations of digital media objects for potential download from the media device to the mobile processing device 100.

Figure 5F:
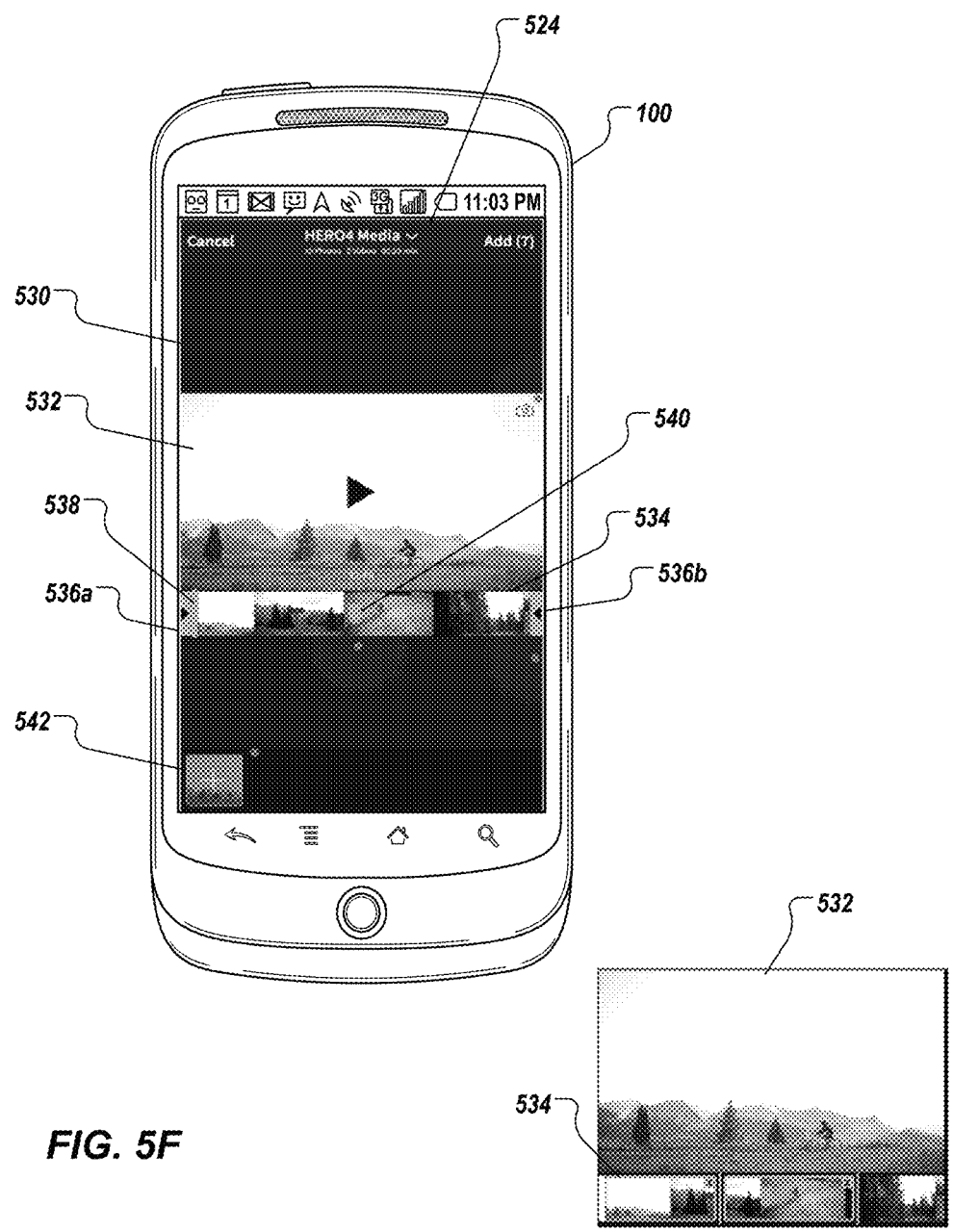
Figure 5G:
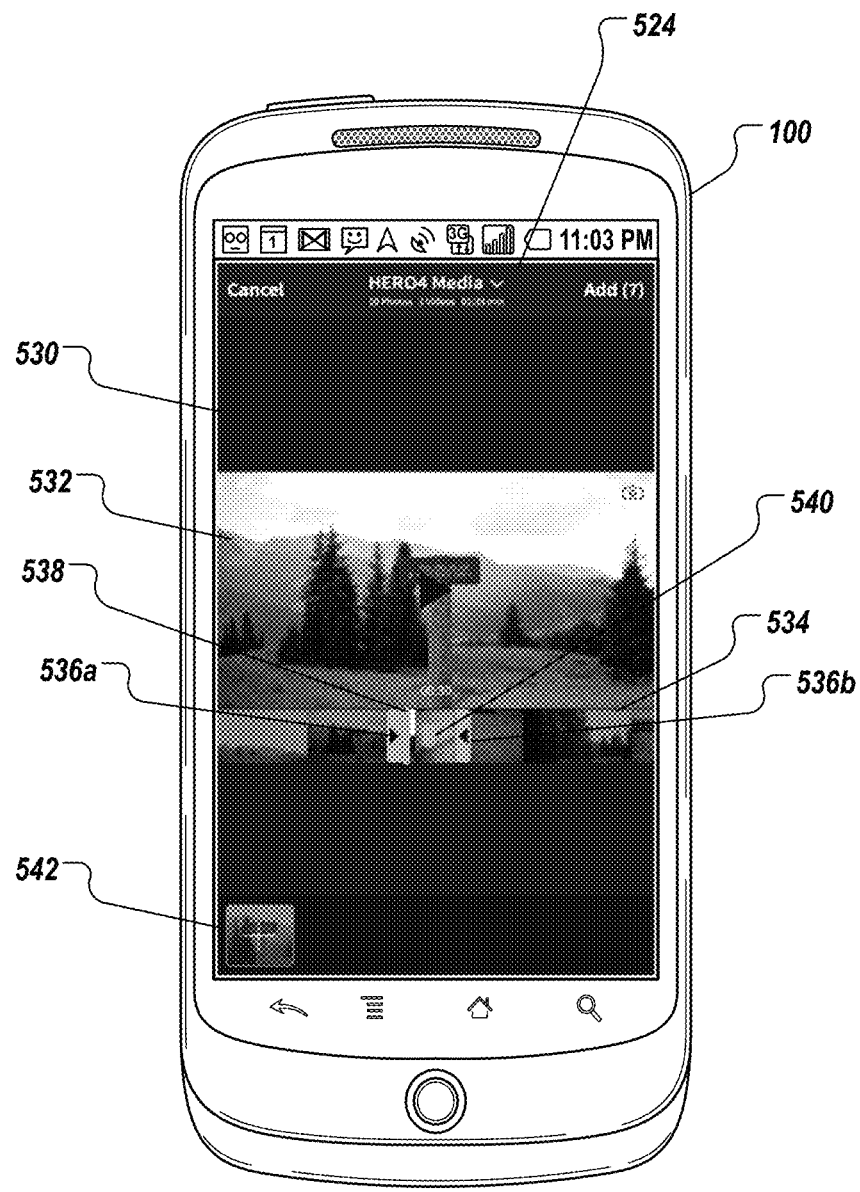
Figure 5H:
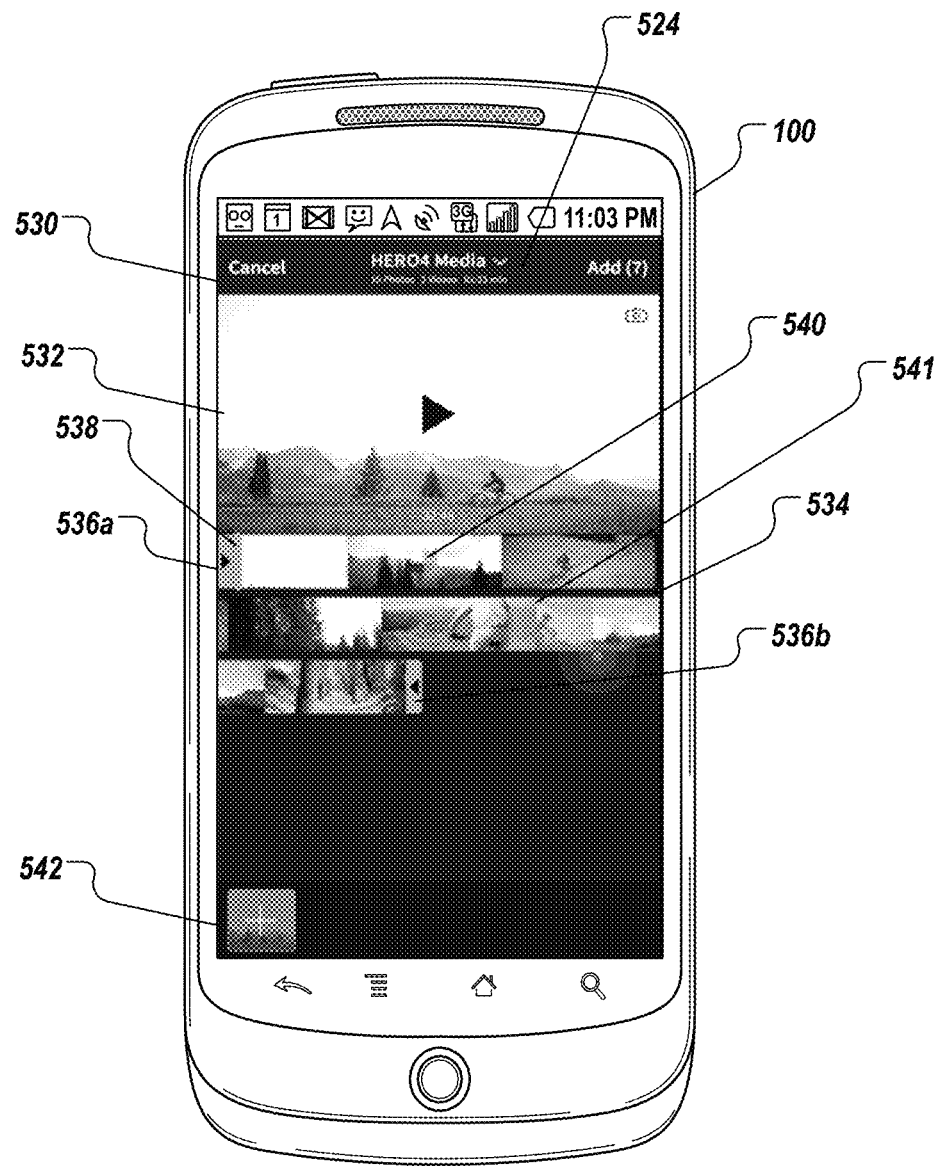

FIGS. 5F-5H depict an example object editing screen 530 in accordance with implementations of the present disclosure. In some examples, the object editing screen 530 is displayed in response to selecting a digital media object for editing, the digital media object being stored on the currently connected media device (e.g., as indicated by media device interface 524). In this manner, the digital media object is edited from the mobile processing device 100 before downloading the digital media object, or portion thereof, to the mobile processing device 100 from the media device.

The object editing screen 530 includes a viewer 532 for viewing the digital media object (e.g., play the digital media object). The object editing screen 530 includes an editor bar 534, which displays a plurality of frames of the digital media object that is being edited. In some examples, the editor bar 534 can be expanded (see FIG. 5H). The editor bar 534 includes handles 536a, 536b, which can be moved to define a beginning and an ending of a sub-object (e.g., snippet) that is to be created from the digital media object. For example, the handle 536a can be moved right-left to define a beginning of the sub-object, and the handle 536b can be moved left-right to define an ending of the sub-object. In some examples, the editor bar 534 includes a partitioning bar 538 that can be used to partition the sub-object into a first portion and a second portion. In some examples, if the partitioning bar 538 is immediately adjacent to a handle 536a, 536b, the partitioning bar 538 does not effect the sub-object (does not partition the sub-object into a first portion and a second portion). In some examples, if the partitioning bar 538 is offset from the handles 536a, 536b, the partitioning bar 538 partitions the sub-object into the first portion and the second portion. In some examples, the first portion runs from the handle 536a to the partitioning bar 538, and the second portion runs from the partitioning bar 538 to the handle 536b. FIG. 5F depicts an example of the editor bar 534 including respective portions highlighted.

In some implementations, the editor bar 534 includes a marker 540, which marks a point within a clip that is provided within the media object being edited. More particularly, and in some examples, the media device enables users to mark a point within a media object that a clip is to be provided. For example, as a user uses the media device to capture digital video (which is subsequently provided as the media object), the user can press a button on the media device to mark the media object, while the user is capturing the video. Consequently, the subsequently provided media object, stored on the media device, includes metadata indicating the point, at which, the marker is provided. In some examples, multiple markers (and hence, multiple clips) can be provided for the media object. In some examples, a clip of a pre-defined length of time (e.g., X seconds, where X is equal to an integer that is less than the running time of the media object) is automatically provided around a marker. In some examples, the length of the clip is defined by the user, or is defined by the media device (and editable by the user). In some examples, the marker indicates the beginning, middle, or end of the clip.

In some implementations, if the media object that is to be edited and displayed in the object editing screen 530 includes one or more markers (inserted by the media device), respective markers 540 are automatically displayed in the editor bar 534. On the other hand, if the media object that is to be edited and displayed in the object editing screen 530 does not include one or more markers (inserted by the media device), respective markers are not automatically displayed in the editor bar 534.

In some implementations, and as seen in FIG. 5H, the editor bar 534 includes a highlighter 541, which indicates one or more potentially interesting frames of the media object being edited. In some examples, frames of the media object can be processed using one or more image recognition techniques to identify a presence of one or more objects within the frame(s), and/or action occurring within the frame(s). For example, a frame (digital image) can be processed using a facial detection engine to detect the presence of one or more faces, and, if a threshold number of faces (e.g., at least one face) are detected in the frame, the frame is highlighted as potentially interesting. As another example, a frame (digital image) can be processed using an object detection engine to detect the presence of one or more objects, and, if a particular type of object (e.g., a person) is detected in the frame, the frame is highlighted as potentially interesting. As another example, two or more frames (digital images) can be processed using an object movement detection engine to detect the presence of and movement of one or more objects, and, if an object is detected in the frames and the object is moving, the frames are highlighted as potentially interesting. In some examples, facial detection, and/or object detection and/or movement detection are performed by the media device that the media object is stored on. In some examples, facial detection, and/or object detection and/or movement detection are performed by the mobile processing device 100, after the frames are transmitted to the mobile processing device 100, as described in further detail herein.

In some implementations, metadata is associated with the media object, the metadata indicating one or more frames of the media object to be highlighted. In some implementations, if the media object that is to be edited and displayed in the object editing screen 530 includes metadata indicating that frames are to be highlighted, respective highlighters 541 are automatically displayed in the editor bar 534.

In some implementations, the object editing screen 530 includes a media object download button 542. In some examples, the media object download button 542 can be selected to download the media object, sub-object, and/or portions thereof to the mobile processing device 100 from the media device. For example, the user can use the object editing screen 530 to define a sub-object of a media object using the handles 536a, 536b, the sub-object running for less time than the media object being edited. When ready, the user can select the media object download button 542 to download the sub-object to the mobile processing device 100 as a media object that is stored on the mobile processing device. In some examples, if the sub-object is partitioned using the partitioning bar 538, the sub-object can be stored as a media object including metadata indicating the location of the partition. In some examples, if the sub-object is partitioned using the partitioning bar 538, the first partition and the second partition of the sub-object can each be stored as independent media objects.

In accordance with implementations of the present disclosure, the media object is streamed from the media device to the mobile processing device for playback in the viewer 532. In this manner, the media object is not downloaded to the mobile processing device 100 for editing. In some examples, one or more frames of the media object are transmitted from the media device for temporary storage (e.g., caching) on the mobile processing device 100. For example, in response to user selection of a media object that is to be edited (e.g., from the media device screen 520 of FIG. 5E), a plurality of frames of the media object are downloaded to the mobile processing device 100. In some examples, the plurality of frames includes a first set of frames (e.g., one or more frames), and a second set of frames (e.g., one or more frames). In some examples, the first set of frames includes consecutive frames that begin at the start of the media object. For example, caching the first few frames of the media object at the mobile computing device. In this manner, if the user selects to play the media object in the viewer 532, playback can proceed based on the frames in the first set of frames, while subsequent frames (subsequent, sequential frames) are requested and received from the media device. In some implementations, the second set of frames includes non-consecutive frames of the media object from different points along the runtime of the media object. In some examples, the frames of the second set of frames are used to populate the editor bar 532. In this manner, the user can have an understanding of what content (e.g., action) is occurring at different points along the runtime of the media object.

In some implementations, in response to the user selecting a play icon (e.g., triangle), the media object can be played in the viewer 532 initially using cached frames (e.g., the first set of frames), and subsequent frames are requested and received from the media device. In this manner, the media object is streamed from the media device for playback on the mobile processing device 100. In some examples, streaming of the media object is halted in response to user selection of a pause icon (e.g., double bars) or a stop icon (e.g., square). That is, subsequent frames are no longer requested from the media device. In some examples, as frames are played they are deleted from memory on the mobile processing device 100. In some examples, frames in the second set of frames remain in memory of the mobile processing device 100, regardless of whether they are played. In this manner, the frames of the second set of frames remain available for display in the editor bar 534.

In some implementations, and as described above, the media object can be edited using the handles 536a, 536b, and/or the partitioning bar 538. In some examples, the locations of the handles 536a, 536b, and/or the partitioning bar 538 are used to define which frames are to be downloaded from the media device. For example, in response to user selection of the media object download button 542, a request can be sent from the mobile processing device 100 to the media player requesting one or more sub-objects from the media object based on data indicating the locations of the handles 536a, 536b, and/or the partitioning bar 538 along the runtime of the media object. In some examples, the media device processes the request and data provided therein to copy frames from the media object that define the sub-object(s) and transmit the sub-object(s) as respective media object(s) to the mobile processing device for persistent storage thereon. In some examples, the media device processes the request and data provided therein to transmit frames from the media object to the mobile processing device 100, and the mobile processing device 100 compiles the frames into respective media object(s) for persistent storage thereon.

FIGS. 5I-5L depict an example project editing screen 550 in accordance with implementations of the present disclosure. In some examples, and as described in further detail herein, the project editing screen 550 is used to create and/or edit a digital media project. In some examples, a digital media project is provided as one or more digital media objects. For example, the user can combine media objects (e.g., from different sources, from the same source) to provide the digital media project. In some examples, the digital media project can include multiple types of media objects (e.g., audio, video, images).

In some examples, the project editing screen 550 is displayed in response to user selection of the add button 506 (e.g., of the projects screen 500 of FIG. 5A), which can be selected to initiate a workflow for creating a new digital media project. In some examples, the project editing screen 550 is displayed in response to user selection of a digital media project 502 (e.g., of the projects screen 500 of FIG. 5A). The project editing screen 550 includes a viewer 552, editing options 554, an insertion button 556, a volume control 558, a speed control 560, and a transition button 562. In the depicted example, the editing options 556 include a cut/trim option (e.g., scissors icon), which enables the user to cut/trim portions of the digital media project, an effects option (e.g., magic wand icon), which enables the user to add effects (e.g., none, fade, noir, sepia) to one or more portions of the digital media project, a text option (e.g., letter icon), which enables the user to add text to one or more portions of the digital media project, and a media selection icon, which enables the user to add one or more media objects to the digital media project, as described in further detail herein.

Figure 5I:
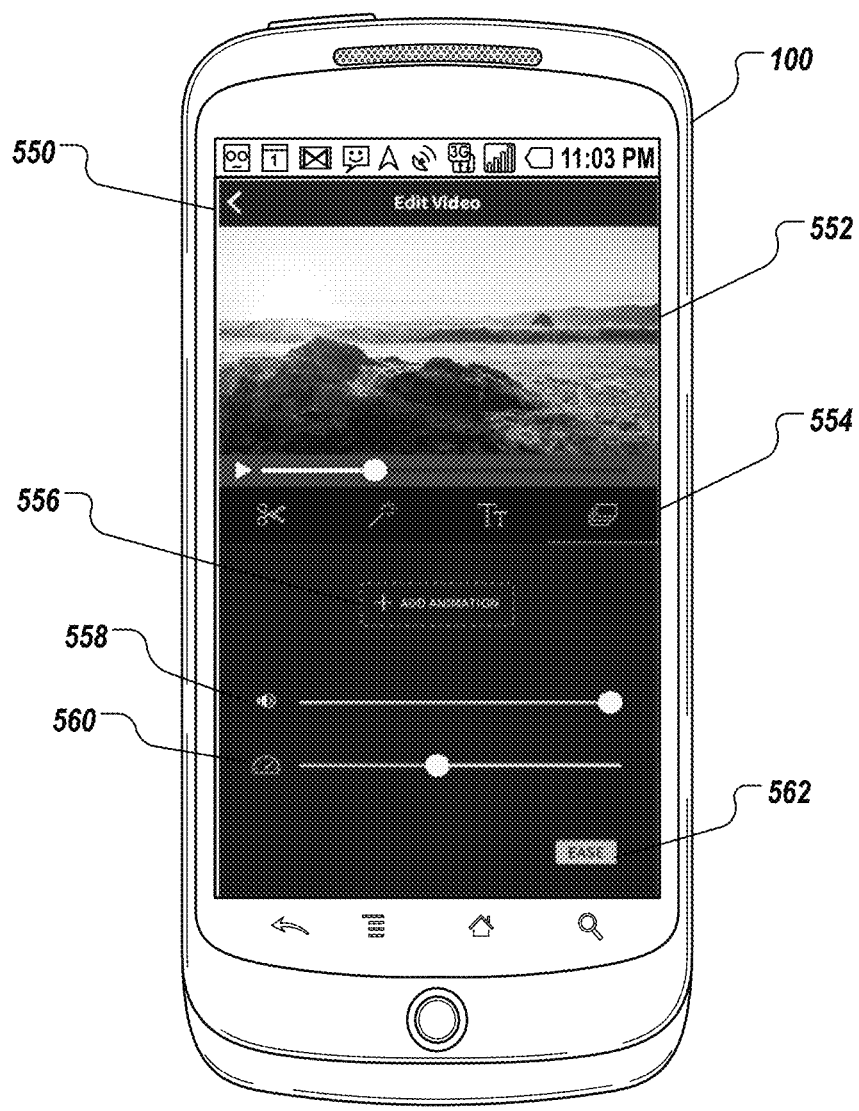

In the example of FIG. 5I, the digital media project being created already includes a media object, which is displayed in the viewer 552. For example, a creation of a new digital media project was initiated, and the user had already selected a first media object for inclusion in the digital media project. As another example, a previously created digital media project was selected for editing, and included the media object. In some examples, the user can select the insertion button 556 to insert another media object into the digital media project. For example, in response to user selection of the insertion button 556, the media screen 514 of FIG. 5C can be displayed, from which the user can select a media object, and, in response to user selection of a media object, the selected media object can be added to the digital media project.

Figure 5J:
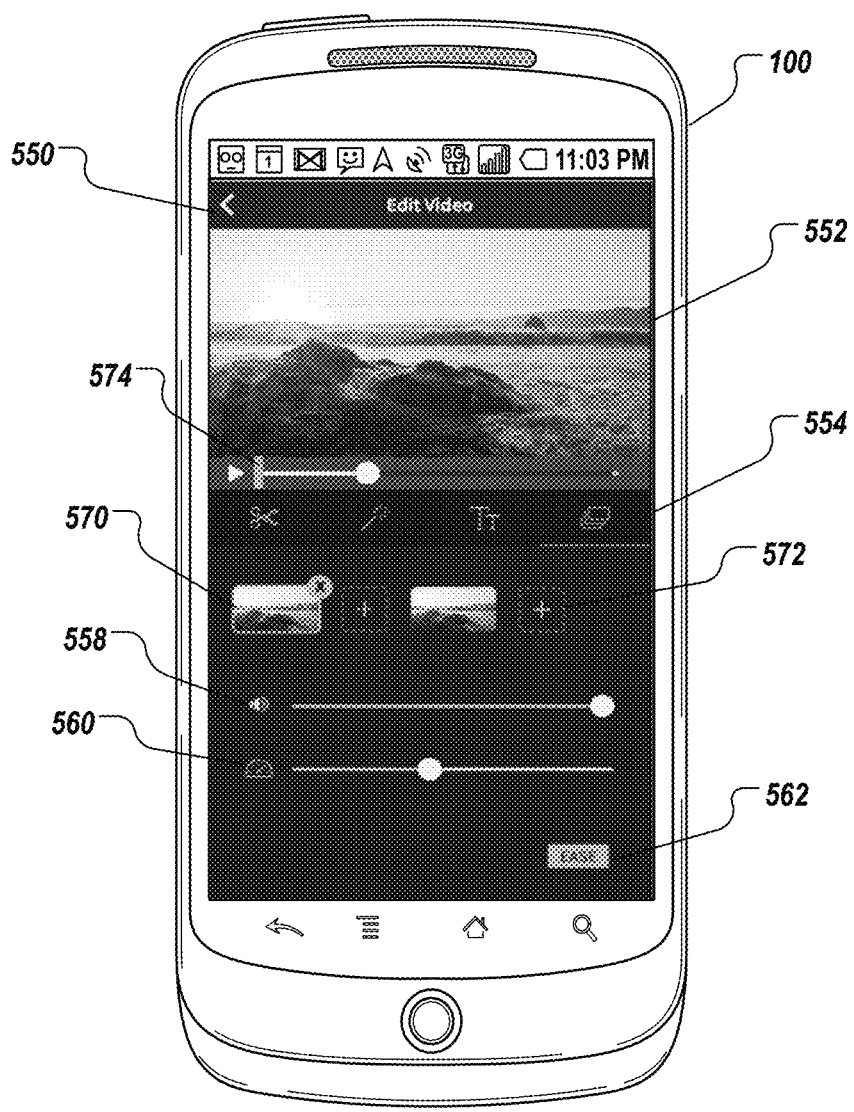

FIG. 5J depicts the project editing screen 500, where multiple media objects are provided in the digital media project. In the depicted example, graphical representations of the multiple media objects 570 are provided. In some examples, a media object 570 can be selected (e.g., as indicated by a highlighted border). In some examples, selection of a media object results in a deletion icon (e.g., an X within a circle) appearing on, partially on, or near the media object 570. In some examples, the user can select the deletion icon, and the respective media object is deleted from the digital media project. In some examples, an insertion icon 572 is displayed between media objects 570. In some examples, an insertion icon 572 can be displayed before the first media object 570, and/or after the last media object 570. In some examples, selecting an insertion icon 572 enables the user to insert a media object at a respective location (the location of the selection insertion icon 572). In some examples, a menu is displayed in response to user selection of an insertion icon 572, which menu includes media object, transition, and/or title options, for example. The user can select the media object option from the menu to select a media object (e.g., from the media screen 514 of FIG. 5C) for insertion. The user can select the transition option from the menu to select a transition for insertion. The user can select the title option from the menu to input a title for insertion.

In the example of FIG. 5J, the project editing screen 500 includes a location bar 574 that can be moved to a particular location along the runtime of the digital media project. For example, the user can tap on and slide the location bar 574 along the runtime, to place the location bar 574 at a desired location. In some examples, the user can edit speed, audio, and/or transitions, among other example features, at the selected location indicated by the location bar 574. For example, the user can use the volume control 558 to adjust a volume of the audio at the particular location. Consequently, during playback of the digital media project, the volume of the audio will transition to the volume set by the user using the volume control 558. In some examples, the volume of the audio remains at the selected setting for the remainder of the playback, or will again transition at another location as indicated by the user during editing. As another example, the user can use the speed control 560 to adjust a playback speed of the video at the particular location. Consequently, during playback of the digital media project, the playback speed of the video will transition to the speed set by the user using the speed control 560. In some examples, the playback speed of the video remains at the selected setting for the remainder of the playback, or will again transition at another location as indicated by the user during editing.

In some examples, the user can select a transition type for transitions (e.g., volume, playback speed) at the selected location using the transition button 562. In some examples, selection of the transition button 562 results in a gradual transition from a current volume/speed to the volume/speed set by the user for the particular location. In this manner, a jump from a current volume/speed is avoided during playback of the digital media project. If, however, a jump is desired, the user need not select the transition button 562. In some implementations, metadata is appended to the digital media project (e.g., the computer-readable file(s), within which the digital media project is stored) based on the various settings. For example, a set of metadata can be provided, which indicates a location (based on the location bar 574), a volume of audio at the location, a playback speed at the location, and/or any effects (e.g., none, fade, noir, sepia) to be displayed at the location.

Figure 5K:
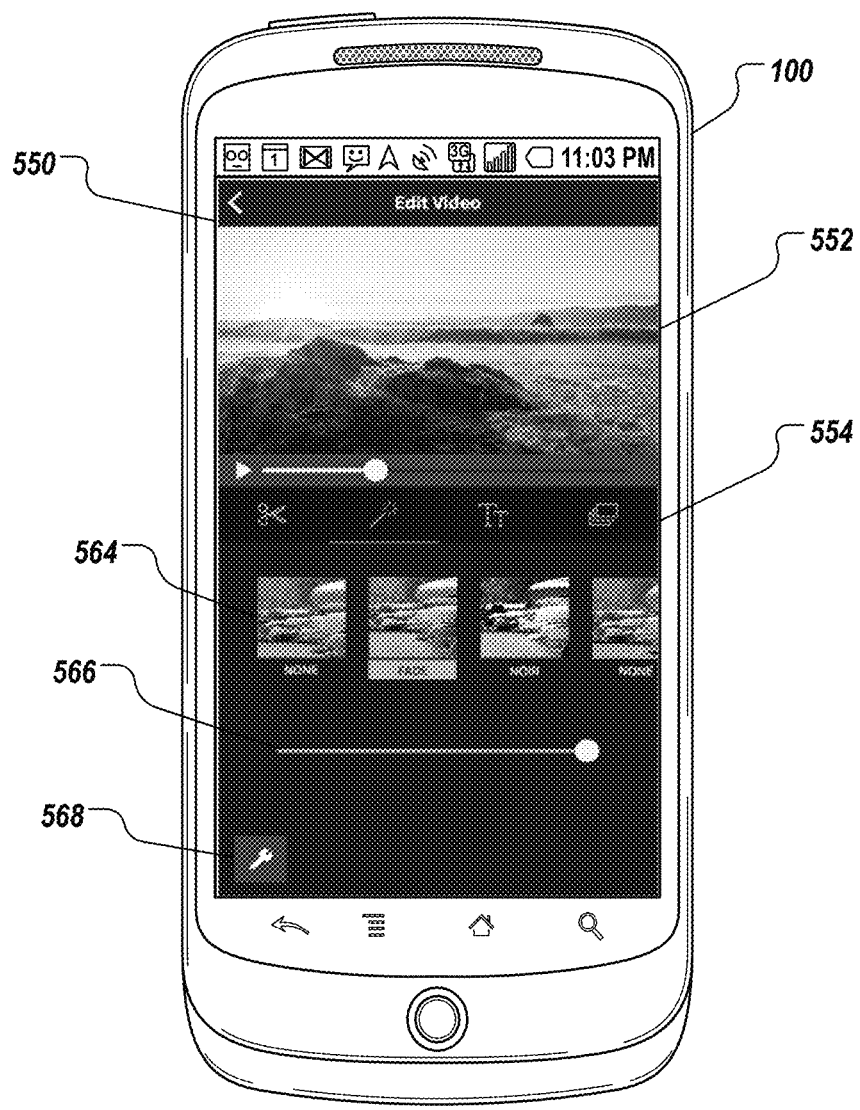
Figure 5L:
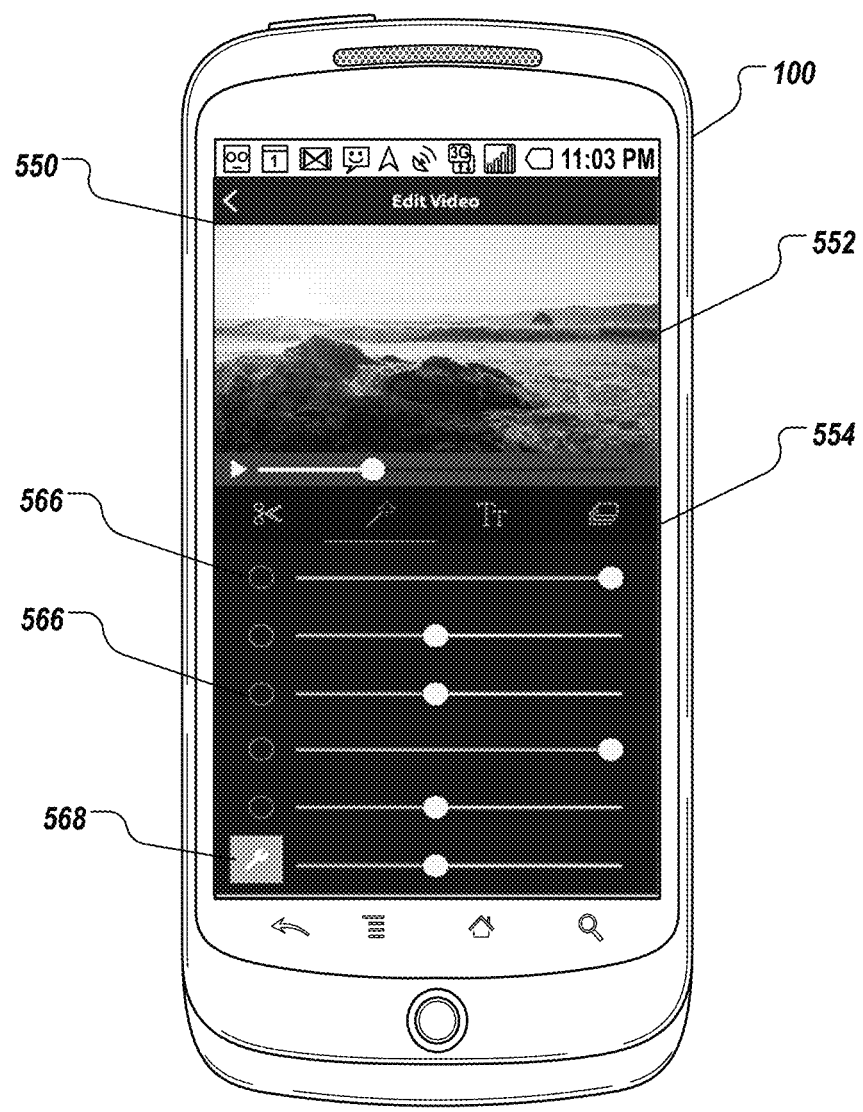

With particular reference to FIG. 5K, one or more effects can be added to the digital media project. For example, the user can select the effects option (e.g., magic wand icon)

from the editing option 554, and in response, graphical representations of one or more effects 564 (e.g., none, fade, noir, sepia) are displayed for selection. In some examples, the user can select an effect 564, which is then added to the digital media project at the specified location. In some examples, an effect setting control 566 is provided to select a setting for the selected effect. Example settings can include color, contrast, sharpness, and the like, to be applied with the effect. In some examples, an effect settings icon 568 is provided, and in response to user selection of the effect setting icon 568, a plurality of effect setting controls 566 are displayed, as depicted in FIG. 5L. In some examples, each effect setting control 566 is particular to a respective setting (e.g., color, contrast, sharpness).

FIGS. 6A-6F depict example screenshots of a digital media editing application for mobile devices in accordance with implementations of the present disclosure.

Figure 6A:
FIGS. 6A-6F depict example screenshots of a digital media editing application for mobile devices in accordance with implementations of the present disclosure.

FIG. 6A depicts an example projects screen 600. In the depicted example, the projects screen 600 provides graphical representations of digital media projects 602 that are stored on the mobile processing device 100. The projects screen 600 includes a selection interface 604 for switching between the projects screen 600, and channel screens. The projects screen 600 includes an add button 606, which can be selected to initiate a workflow for creating a new digital media project. In some examples, a graphical representation of a digital media project 602 can be selected to initiate view and/or editing of the digital media project 602.

In some implementations, in response to user selection of the channel option from the selection interface 604, one or more available channels can be displayed to the user. In general, a channel includes an external digital media source (e.g., the media device 402, computer-implemented services provided by the server system 406). In some examples, a channel also includes media objects stored on the mobile processing device 100 (e.g., the "camera roll" of the mobile processing device 100). In some examples, in response to user selection of a particular channel, a channel screen is displayed on the mobile processing device 100.

Figure 6B:
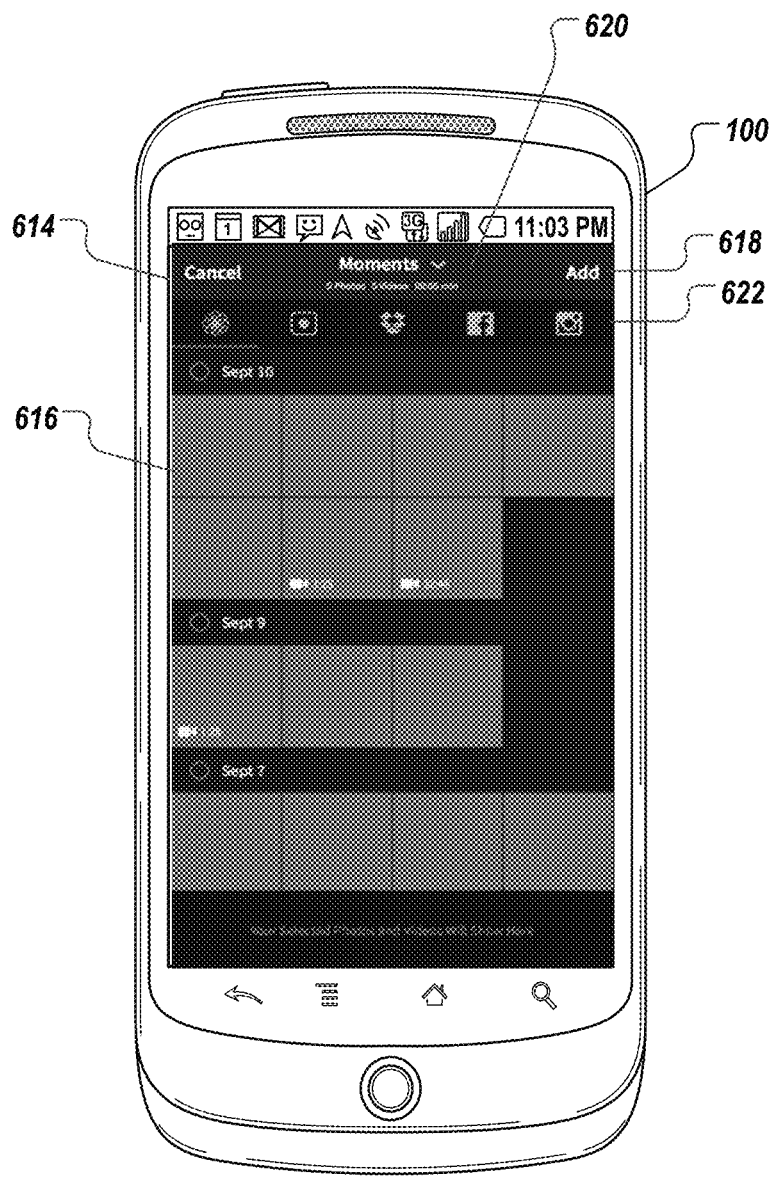

FIG. 6B depicts an example channel screen 614. In the depicted example, the channel screen 614 corresponds to media objects stored on the mobile processing device 100 (e.g., the "camera roll" of the mobile processing device 100). In the depicted example, the channel screen 614 provides graphical representations of digital media objects 616 (e.g., images, video, audio) that are stored on the mobile processing device 100. The channel screen 614 includes an add button 618, which can be selected to initiate a workflow for creating a new media object. n some examples, a graphical representation of a digital media object 616 can be selected to initiate view and/or editing of the digital media object 616, and/or creation of a digital media project based on the digital media object 616. The channel screen 614 includes a filter option 620, which can be used to filter the media objects 616 that are displayed. In some examples, the media objects can be filtered/organized based on date (e.g., moments), type (e.g., images, video, audio), duration, and the like.

In the depicted example, the channel screen 614 includes a channel selection interface 622, which includes a plurality of options for selecting respective channels as sources of digital media objects to be displayed in the media screen 614. In the depicted example, the channels include the mobile processing device 100 (e.g., the camera roll) indicated by a flower-like icon, a media device (e.g., GoPro camera indicated by the GoPro icon), a computer-implemented, file hosting service (e.g., Dropbox indicated by the Dropbox logo), a computer-implemented, social networking service (e.g., Facebook indicated by the Facebook logo), and a computer-implemented, content-sharing service (e.g., Instagram indicated by the Instagram logo). In some examples, the user can select a channel from the channel selection interface 622 to initiate connection to the selected channel (e.g., over a network).

Figure 6C:
Figure 6D:
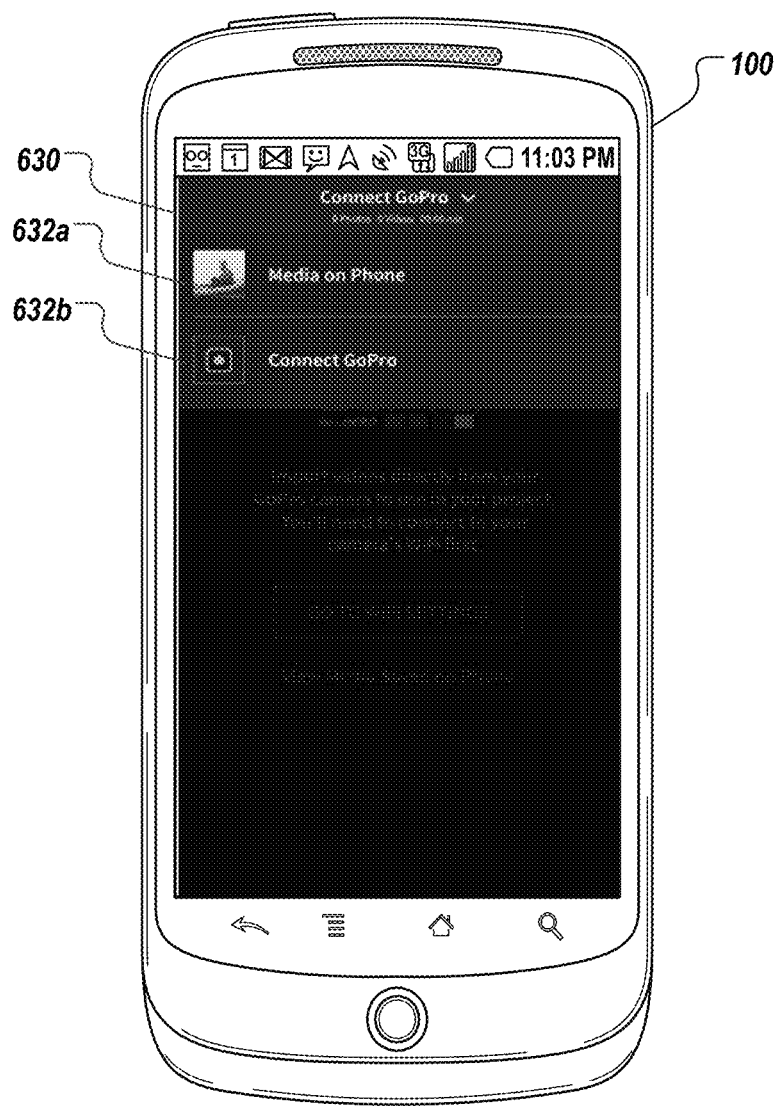

Connection to a selected channel (e.g., a media device) will now be described with reference to FIGS. 6C-6E. In some examples, in response to the user selecting the media device channel from the channel selection interface 622, connection to the selected media device is initiated. In some examples, if a media device has not yet been connected to the mobile processing device 100, a workflow is executed to establish a connection. For example, and with reference to FIG. 5C, a connection screen 628, through which the user can establish a connection between the mobile processing device 100 and the media device. FIG. 6D depicts a media object selection screen 630 that is specific to a respective media device. In the depicted example, the user has the option of viewing media objects that are from the media device, but are stored on the mobile processing device (option 632a), or that are stored on the media device (option 632b).

Figure 6E:
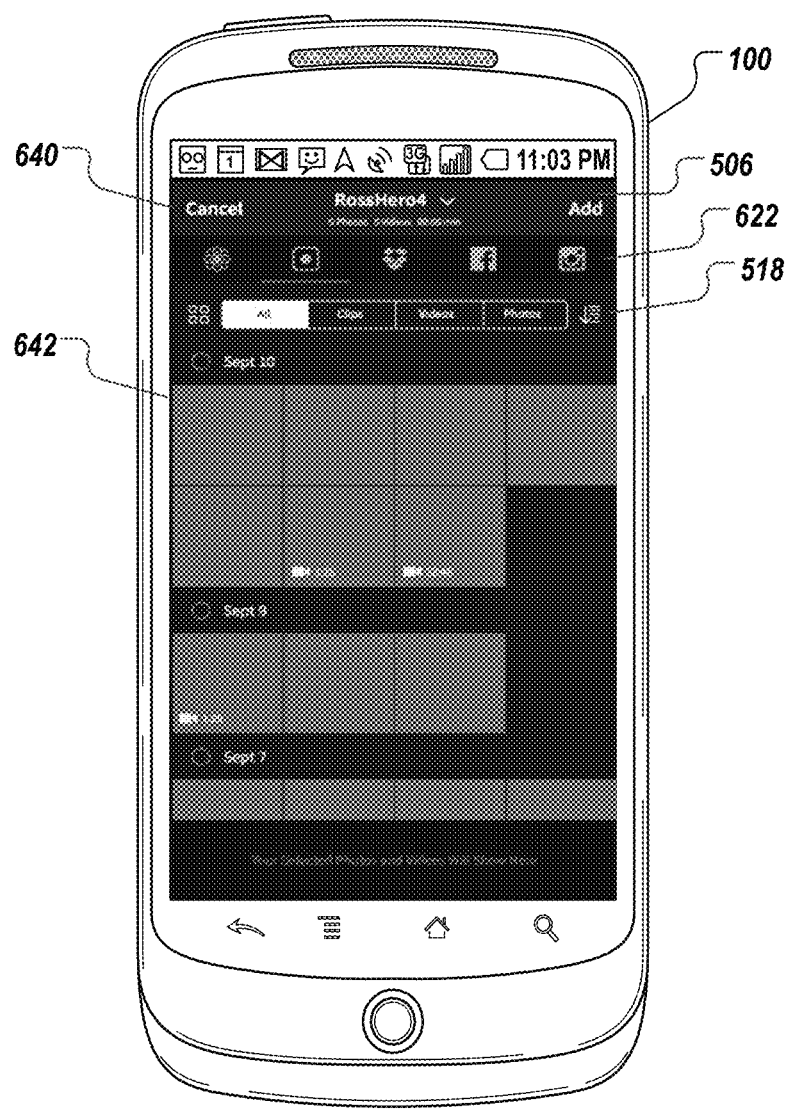

FIG. 6E depicts an example media screen 640. In the depicted example, the media screen 640 provides graphical representations of digital media objects 642 (e.g., images, video, audio) that are stored on the mobile processing device 100. The media screen 640 includes the channel selection interface, and the media type selection interface 518 described above. In some examples, a graphical representation of a digital media object 642 can be selected to initiate view and/or editing of the digital media object 642, and/or creation of a digital media project based on the digital media object 642.

Figure 6F:
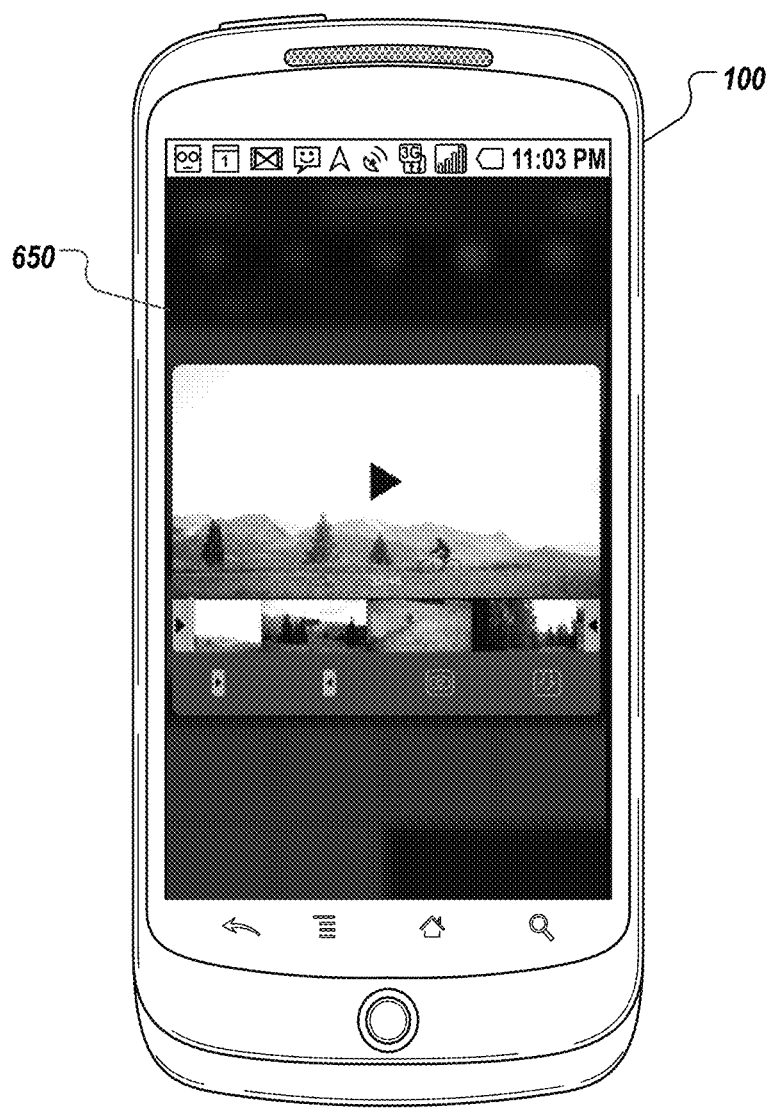
Figure 7B:
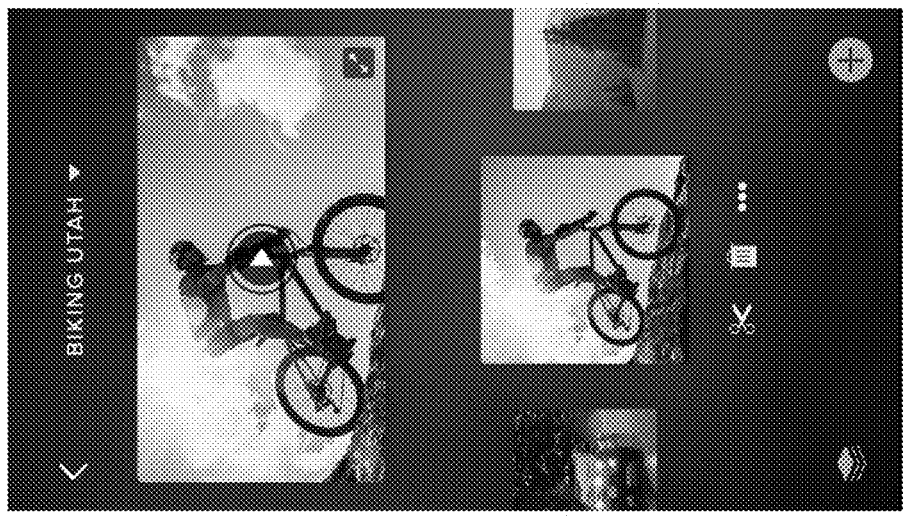
Figure 7A:
Figure 7D:
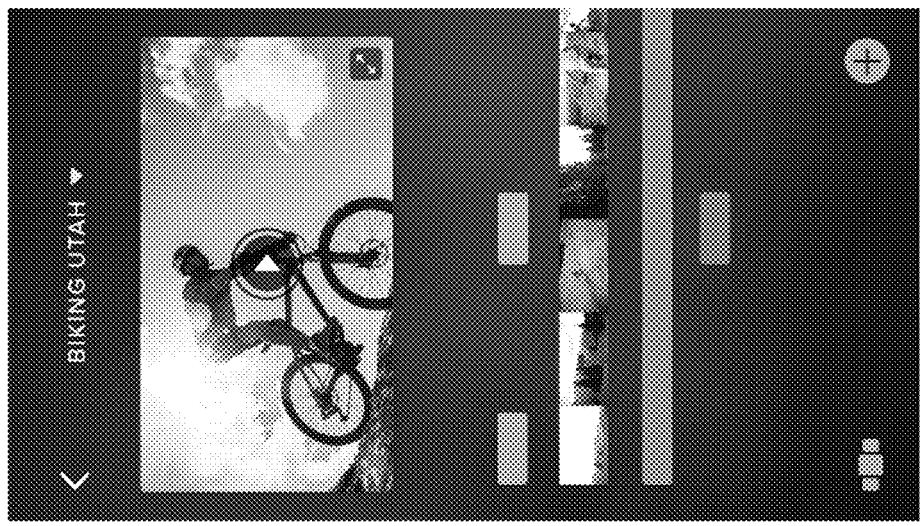
Figure 7C:
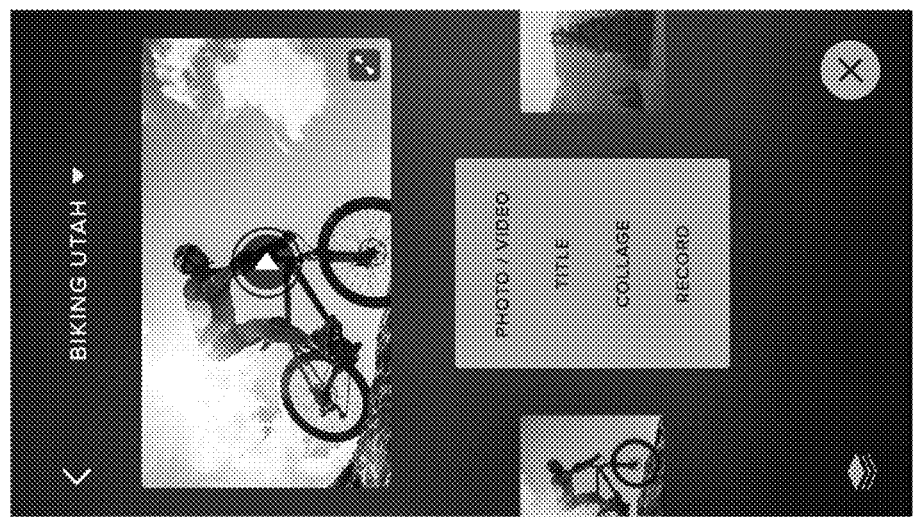
Figure 7H:
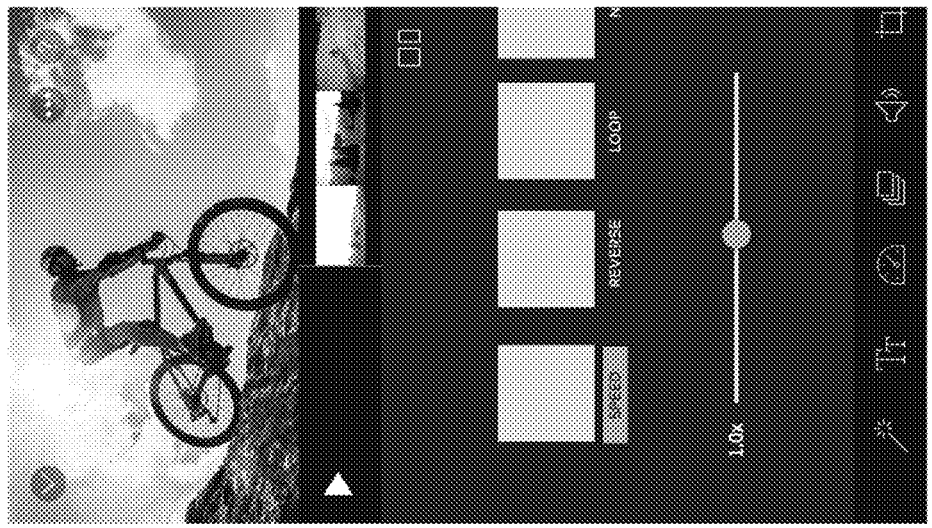
Figure 7G:
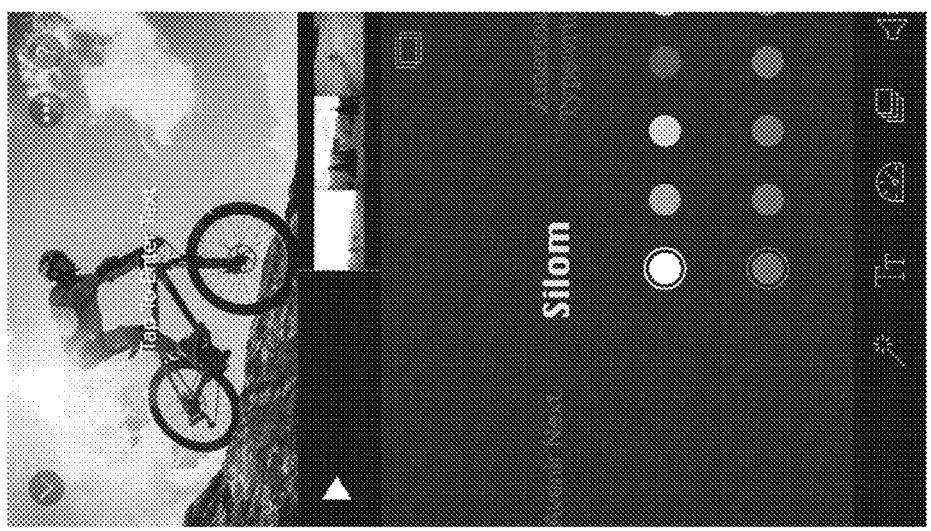
Figure 7I:
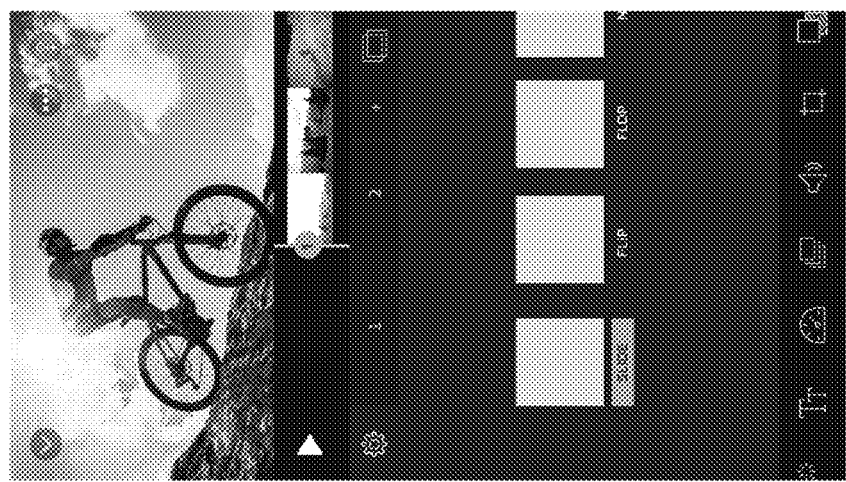
Figure 7J:
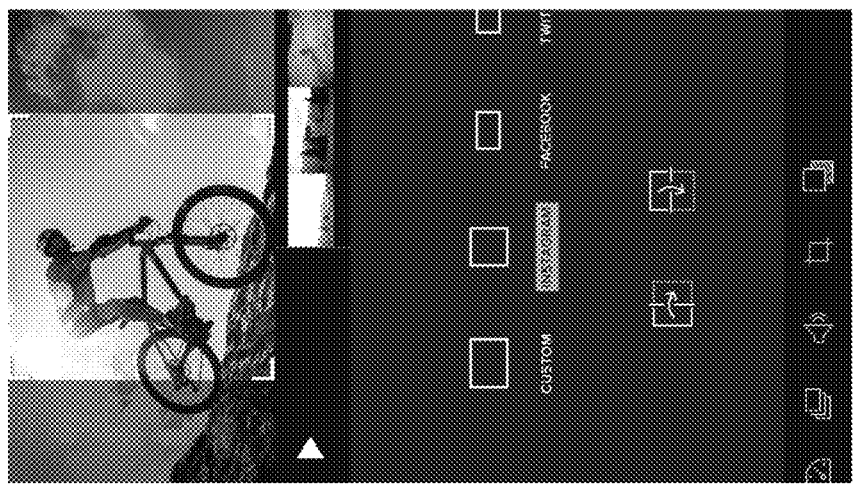
Figure 7L:
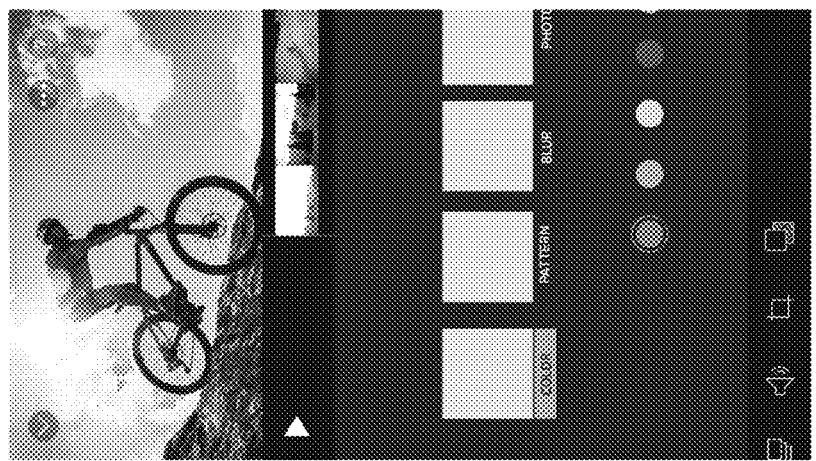
Figure 7K:
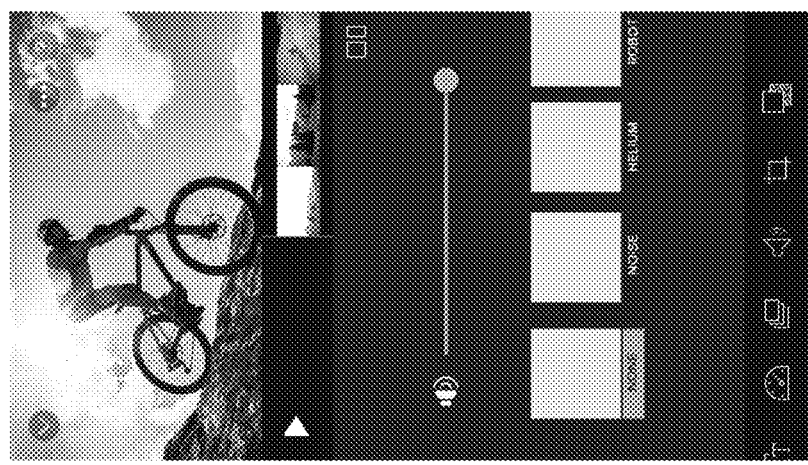
Figure 8B:
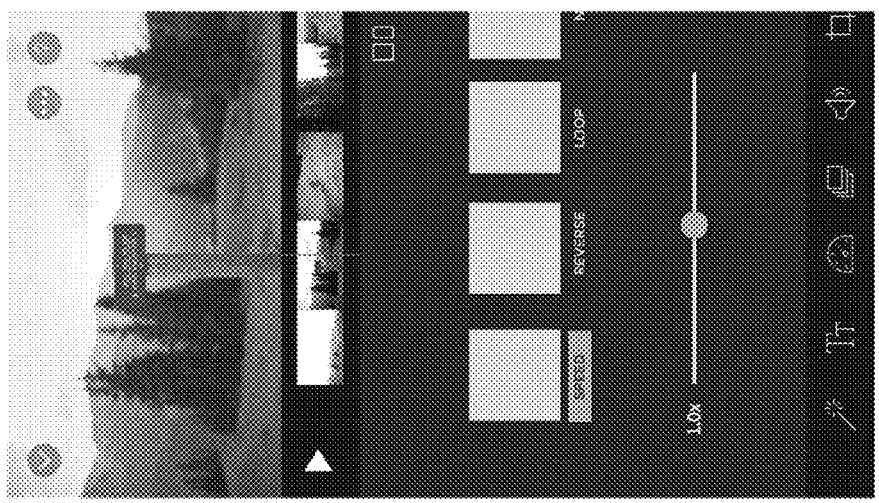
FIGS. 8A-8F depict example screenshots of a digital media editing application for mobile devices in accordance with implementations of the present disclosure.
Figure 8A:
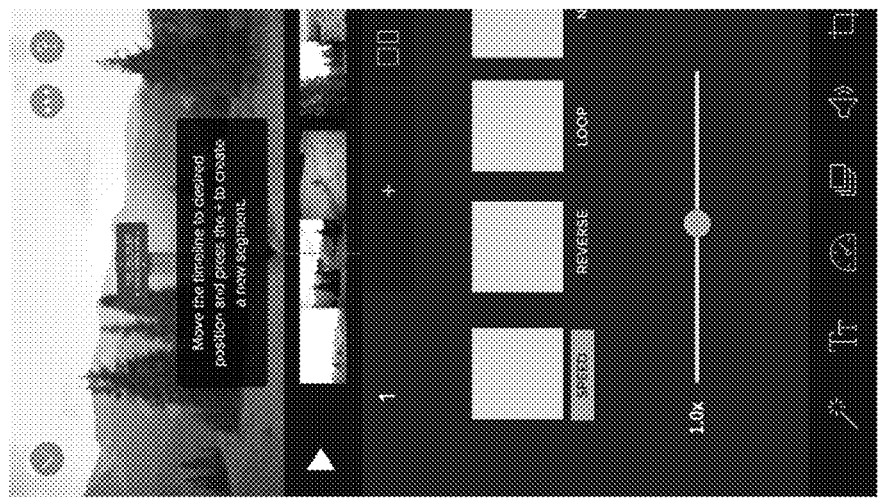
Figure 8D:
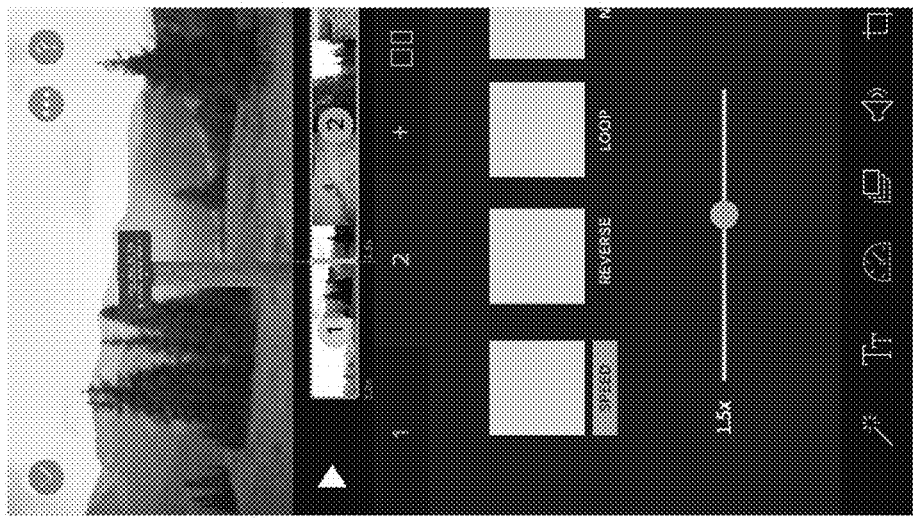
Figure 8C:
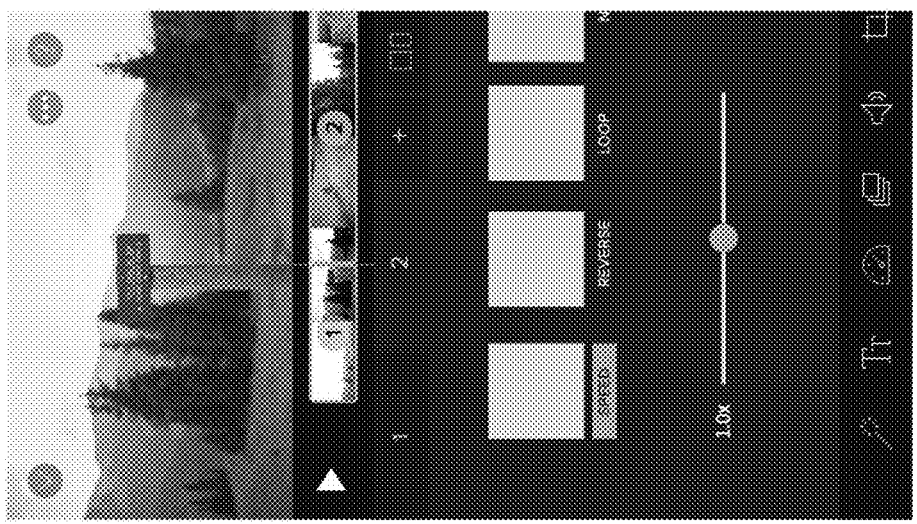
Figure 8F:
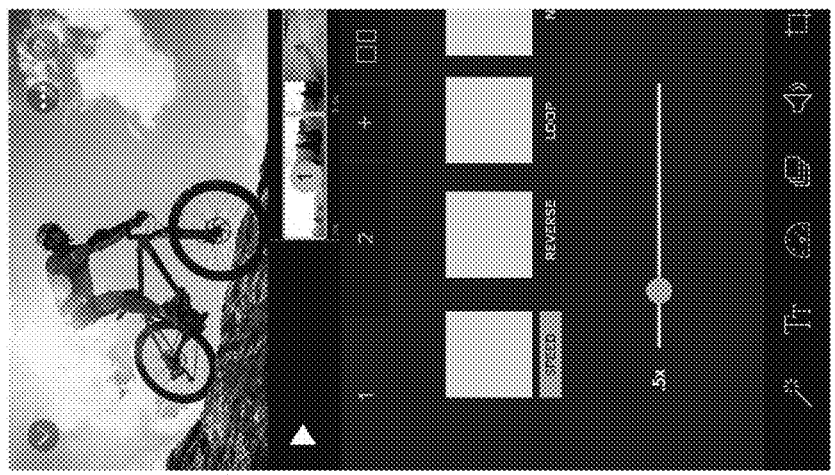
Figure 8E:
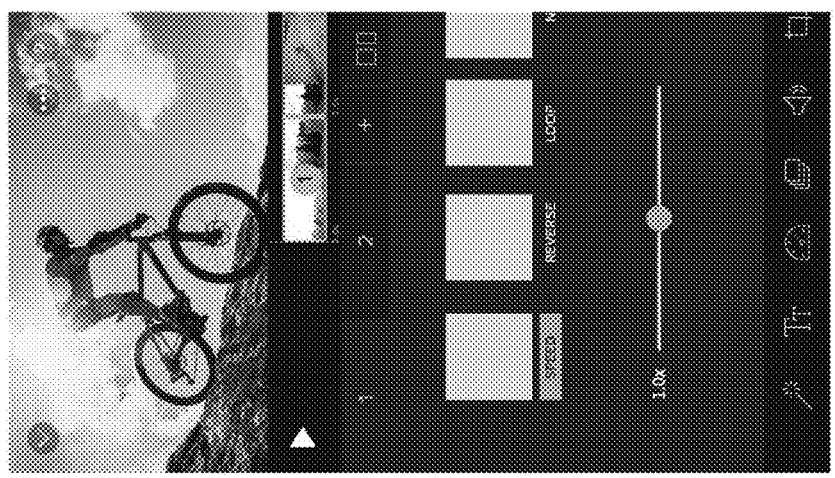

FIG. 6F depicts an example object editing screen 650 in accordance with implementations of the present disclosure. In some examples, the object editing screen 650 functions and includes the same options as the object editing screen 530 of FIGS. 5F-5H.

FIGS. 7A-7L depict example screenshots of a digital media editing application for mobile devices in accordance with implementations of the present disclosure.

FIGS. 8A-8F depict example screenshots of a digital media editing application for mobile devices in accordance with implementations of the present disclosure.

Figure 9:
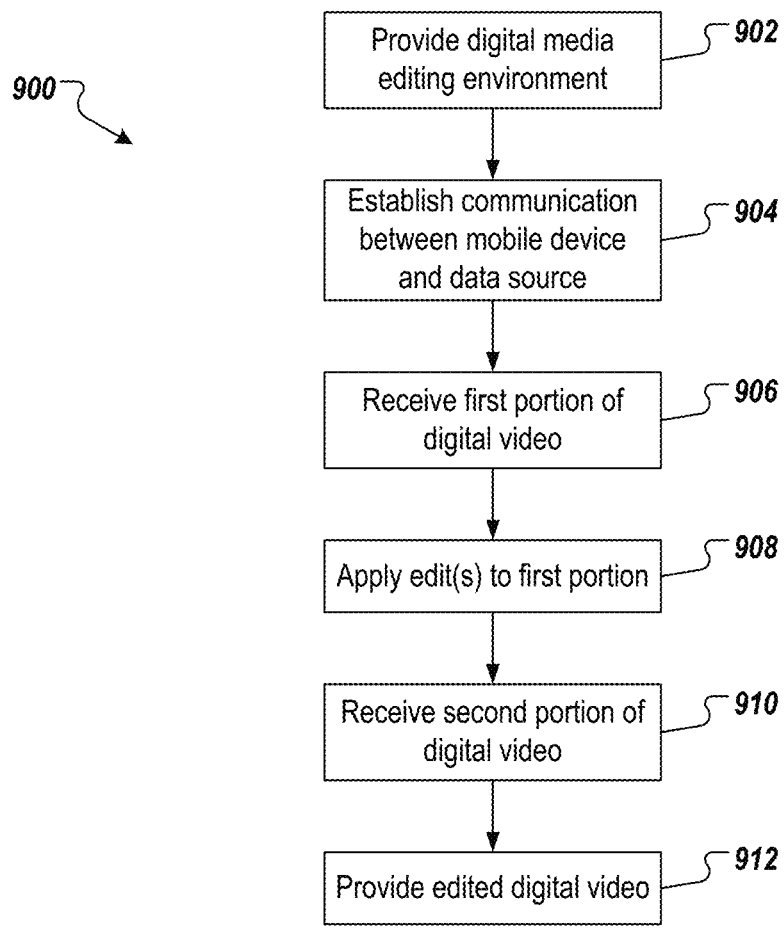
FIG. 9 depicts an example process that can be executed in accordance with implementations of the present disclosure.

FIG. 9 depicts an example process 900 that can be executed in accordance with implementations of the present disclosure. In some examples, the example process 900 can be provided by one or more computer-executable programs executed using one or more computing devices (e.g., the mobile computing device 100). In some examples, the example process 900 is executed to edit one or more digital videos using a mobile device.

A digital media editing environment is provided (902). For example, the digital media editing environment is provided as one or more computer-executable applications executed by a mobile device (e.g., the mobile computing device 100). In some examples, the digital media editing environment is provided for editing at least a portion of a digital video using the mobile device. Communication is established between the mobile device and a data source (904). For example, communication is established between the mobile computing device 100, and one of the media device 404, and the server system 406, as described herein with reference to FIG. 4.

A first portion of the digital video is received from the data source (906). For example, a first portion of the digital video is received by the mobile device from the data source. In some examples, the first portion is provided as a low-resolution version of the digital video. For example, the first portion includes a first set of frames having less than all frames of the digital video. At least one edit is applied to the first portion of the digital video (908). For example, a user used the digital media editing environment to apply the at least one edit. Example edits can include, without limitation, deletion of one or more frames, insertion of one or more frames, adding an effect (e.g., text, black and white, sepia, zoom in/out), adding a transition, adding audio, including slow motion, including fast-forward, and the like. In the example case of slow motion, applying an edit can include inserting additional frames, and/or instructions to reduce a playback speed. For example, in response to user input selecting slow motion, the digital media editing environment can insert additional frames (e.g., copies of frames), and/or computer-executable instructions into a respective segment of the first portion. In the example case of fast forward, applying an edit can include removing frames, and/or providing instructions to increase a playback speed. For example, in response to user input selecting fast forward, the digital media editing environment can remove frames, and/ or insert computer-executable instructions into a respective segment of the first portion. Accordingly, actions performed to apply an edit can depend on the particular edit. In accordance with implementations of the present disclosure, the at last one edit is applied while less than all frames of the digital video are stored on the mobile device.

Subsequent to applying the at least one edit, a second portion of the digital video is received from the data source (910). For example, a second portion of the digital video is received by the mobile device from the data source. In some examples, the second portion includes a second set of frames of the digital video. An edited digital video is provided on the mobile device (912). In some examples, the edited digital video includes at least one frame of the first set of frames, at least one frame of the second set of frames, and the at least one edit.

Although described in the context of a mobile device application operating on a mobile processing device, it is contemplated that implementations of the present disclosure, and all of the functional operations provided herein, can be realized in any suitable type of digital electronic circuitry, or in computer software, firmware, or hardware, including the structures disclosed in this specification and their structural equivalents, or in combinations of one or more of them. Implementations of the present disclosure can also be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure includes some specifics, these should not be construed as limitations on the scope of the disclosure or of what can be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications can be made without departing from the spirit and scope of the disclosure. For example, various forms of the flows shown above can be used, with steps re-ordered, added, or removed. Accordingly, other implementations are within the scope of the following claims.

What is claimed is:

1. A computer-implemented method for editing one or more digital videos using a mobile device, the method being executed by one or more processors of the mobile device and comprising:
    providing, by the one or more processors, a digital media editing environment for editing at least a portion of a first digital video using the mobile device;
    establishing, by the one or more processors, communication between the mobile device and a data source;
    receiving, by the one or more processors, and from the data source, a first portion of the first digital video, the first portion comprising a first set of frames including less than all frames of the first digital video;
    applying, by the one or more processors, at least one edit to the first portion of the first digital video, while less than all frames of the first digital video are stored on the mobile device;
    subsequent to applying the at least one edit, receiving, by the one or more processors, and from the data source, a second portion of the first digital video, the second portion comprising a second set of frames of the first digital video; and
    storing, by the one or more processors, an edited digital video on the mobile device, the edited digital video comprising at least one frame of the first set of frames, at least one frame of the second set of frames, and the at least one edit;
    wherein the first set of frames consists of every $z^{th}$ frame of the first digital video, where z is an integer that is greater than or equal to 2.

2. The method of claim 1, wherein the first portion of the digital video comprises a low-resolution version of the digital video.

3. The method of claim 1, wherein the edited digital video comprises less than all frames of the first digital video.

4. The method of claim 1, wherein less than all frames of the first digital video are received by the mobile device.

5. The method of claim 1, wherein the second set of frames comprises frames of the first digital video that are absent from the first set of frames.

6. The method of claim 1, wherein the edited digital video comprises at least a portion of a second digital video that is received by the mobile device.

7. The method of claim 1, wherein the data source comprises a media device.

8. The method of claim 1, wherein the data source comprises a server system that stores digital content.

9. The method of claim 1, wherein the mobile device comprises one of a tablet computing device, a smartphone, and a media device.

10. A non-transitory computer-readable storage medium coupled to one or more processors and having instructions stored thereon which, when executed by the one or more processors, cause the one or more processors to perform operations for editing one or more digital videos using a mobile device, the operations comprising:
    providing a digital media editing environment for editing at least a portion of a first digital video using the mobile device;
    establishing communication between the mobile device and a data source;
    receiving, from the data source, a first portion of the first digital video, the first portion comprising a first set of frames including less than all frames of the first digital video;
    applying at least one edit to the first portion of the first digital video, while less than all frames of the first digital video are stored on the mobile device;
    subsequent to applying the at least one edit, receiving, from the data source, a second portion of the first digital video, the second portion comprising a second set of frames of the first digital video; and
    storing an edited digital video on the mobile device, the edited digital video comprising at least one frame of the first set of frames, at least one frame of the second set of frames, and the at least one edit;
    wherein the first set of frames consists of every $z^{th}$ frame of the first digital video, where z is an integer that is greater than or equal to 2.

11. The computer-readable storage medium of claim 10, wherein the first portion of the digital video comprises a low-resolution version of the digital video.

12. The computer-readable storage medium of claim 10, wherein the edited digital video comprises less than all frames of the first digital video.

13. The computer-readable storage medium of claim 10, wherein less than all frames of the first digital video are received by the mobile device.

14. A system, comprising:
    a data source; and
    a mobile device having a computer-readable storage device having instructions stored thereon which, when executed by the mobile device, cause the mobile device to perform operations for editing one or more digital videos using the mobile device, the operations comprising:

providing a digital media editing environment for editing at least a portion of a first digital video using the mobile device;
establishing communication between the mobile device and a data source;
receiving, from the data source, a first portion of the first digital video, the first portion comprising a first set of frames including less than all frames of the first digital video;
applying at least one edit to the first portion of the first digital video, while less than all frames of the first digital video are stored on the mobile device;
subsequent to applying the at least one edit, receiving, from the data source, a second portion of the first digital video, the second portion comprising a second set of frames of the first digital video; and
storing an edited digital video on the mobile device, the edited digital video comprising at least one frame of the first set of frames, at least one frame of the second set of frames, and the at least one edit;
wherein the first set of frames consists of every $z^{th}$ frame of the first digital video, where z is an integer that is greater than or equal to 2.

15. The system of claim 14, wherein the first portion of the digital video comprises a low-resolution version of the digital video.

16. The system of claim 14, wherein the edited digital video comprises less than all frames of the first digital video.

17. The system of claim 14, wherein less than all frames of the first digital video are received by the mobile device.

* * * * *